(12) United States Patent
Hershko et al.

(10) Patent No.: US 9,094,332 B2
(45) Date of Patent: Jul. 28, 2015

(54) DYNAMIC ADAPTIVE AGGREGATION SCHEMES FOR ENHANCING PERFORMANCE OF COMMUNICATION SYSTEMS

(71) Applicant: Qualcomm Incorporated, San Diego, CA (US)

(72) Inventors: Yuval Corey Hershko, Haifa (IL); Haim Snapy, Haifa (IL); Amit Gil, Haifa (IL)

(73) Assignee: Qualcomm Incorporated, San Diego, CA (US)

( * ) Notice: Subject to any disclaimer, the term of this patent is extended or adjusted under 35 U.S.C. 154(b) by 288 days.

(21) Appl. No.: 13/734,847

(22) Filed: Jan. 4, 2013

(65) Prior Publication Data

US 2014/0192821 A1     Jul. 10, 2014

(51) Int. Cl.
*H04J 3/24* (2006.01)
*H04L 12/801* (2013.01)

(52) U.S. Cl.
CPC ................................... *H04L 47/34* (2013.01)

(58) Field of Classification Search
USPC .......................................... 370/474, 476, 473
See application file for complete search history.

(56) References Cited

U.S. PATENT DOCUMENTS

| | | | |
|---|---|---|---|
| 7,376,141 B2 * | 5/2008 | Rosengard et al. | 370/412 |
| 8,204,005 B2 * | 6/2012 | Liu et al. | 370/329 |
| 8,244,906 B2 | 8/2012 | Aloni et al. | |
| 2008/0117919 A1 | 5/2008 | Kliger et al. | |
| 2010/0131124 A1 * | 5/2010 | Klooster | 701/3 |
| 2012/0044819 A1 | 2/2012 | Lin | |
| 2012/0057511 A1 | 3/2012 | Sivakumar et al. | |

FOREIGN PATENT DOCUMENTS

EP     1619834 A1     1/2006

OTHER PUBLICATIONS

Li, et al., "LBA: Lifetime balanced data aggregation in low duty cycle sensor networks", 2012 Proceedings IEEE INFOCOM, 2012, pp. 1844-1852.
International Search Report and Written Opinion—PCT/US2013/077115—ISA/EPO—Mar. 24, 2014
Xiang Q., et al., "When In-Network Processing Meets Time: Complexity and Effects of Joint Optimization in Wireless Sensor Networks", Real-Time Systems Symposium, 2009, RTSS 2009. 30th IEEE, IEEE, Piscataway, NJ, USA, Dec. 1, 2009, pp. 148-157, XP031592561, ISBN: 978-0-7695-3875-4 abstract paragraph [IV.A].

* cited by examiner

*Primary Examiner* — Peter Cheng
(74) *Attorney, Agent, or Firm* — Abdollah Kathbab

(57) ABSTRACT

A method, an apparatus, and a computer program product for communication are provided. The apparatus aggregates data sets as a function of an estimated characteristic of a next data set to arrive, and adaptively adjust the estimated characteristic based on a statistical measure of the estimated characteristic derived from a plurality of previously arrived data sets. The estimated characteristic may be an estimated next arrival time of the next data set, or an estimated size of the next data set.

12 Claims, 18 Drawing Sheets

DYNAMIC ADAPTIVE AGGREGATION SCHEMES FOR ENHANCING PERFORMANCE OF COMMUNICATION SYSTEMS

BACKGROUND

1. Field

The present disclosure relates generally to communication systems, and more particularly, to schemes for aggregating data sets for transmission by communication systems.

2. Background

In communication systems, a communication link includes a transmit entity and a receive entity. There may be more than one entity of each kind and entities might switch roles. Every transmit operation incurs some overhead per transmitted data, that is caused by the handling, encoding and physical transmission of each transmitted bit. In many communication systems the transmitted data is divided into discrete data sets, usually referred to as "packets" or "frames". The terms "data set", "packet", and "frame" are synonymous as used herein and may be used interchangeably. In such cases there is usually a transmit overhead that is incurred per transmitted packet. It is desirable to minimize the accumulated transmit overhead.

SUMMARY

In an aspect of the disclosure, a method, a computer program product, and an apparatus are provided. The apparatus aggregates data sets as a function of an estimated characteristic of a next data set to arrive, and adaptively adjust the estimated characteristic based on a statistical measure of the estimated characteristic derived from a plurality of previously arrived data sets.

The estimated characteristic may be an estimated next arrival time of the next data set. In this case, the apparatus aggregates a last arrived data set, updates an average arrival interval for a number of previously arrived data sets, and calculates an estimated next arrival time based on the arrival time of the last arrived data set and the updated average arrival interval. The apparatus then adjusts the estimated next arrival time based on the statistical measure of the estimated characteristic, and waits for the next data set if the adjusted estimated next arrival time does not exceed an aggregation time out, or sends the aggregated data sets if the estimated next arrival time exceeds the aggregation time out.

Alternatively, the characteristic may be an estimated size of the next data set. In this case, the apparatus aggregates a last arrived data set, updates an average size for a number of previously arrived data sets, and calculates an estimated next size based on the updated average size. The apparatus then calculates an estimated aggregated size based on the estimated next data set size and a size of the already aggregated data sets, and waits for the next data set to arrive if the estimated aggregated size does not exceed a maximum aggregation size, or sends the aggregated data set if the estimated aggregated size exceeds the maximum aggregation size.

DETAILED DESCRIPTION

Figure 1:
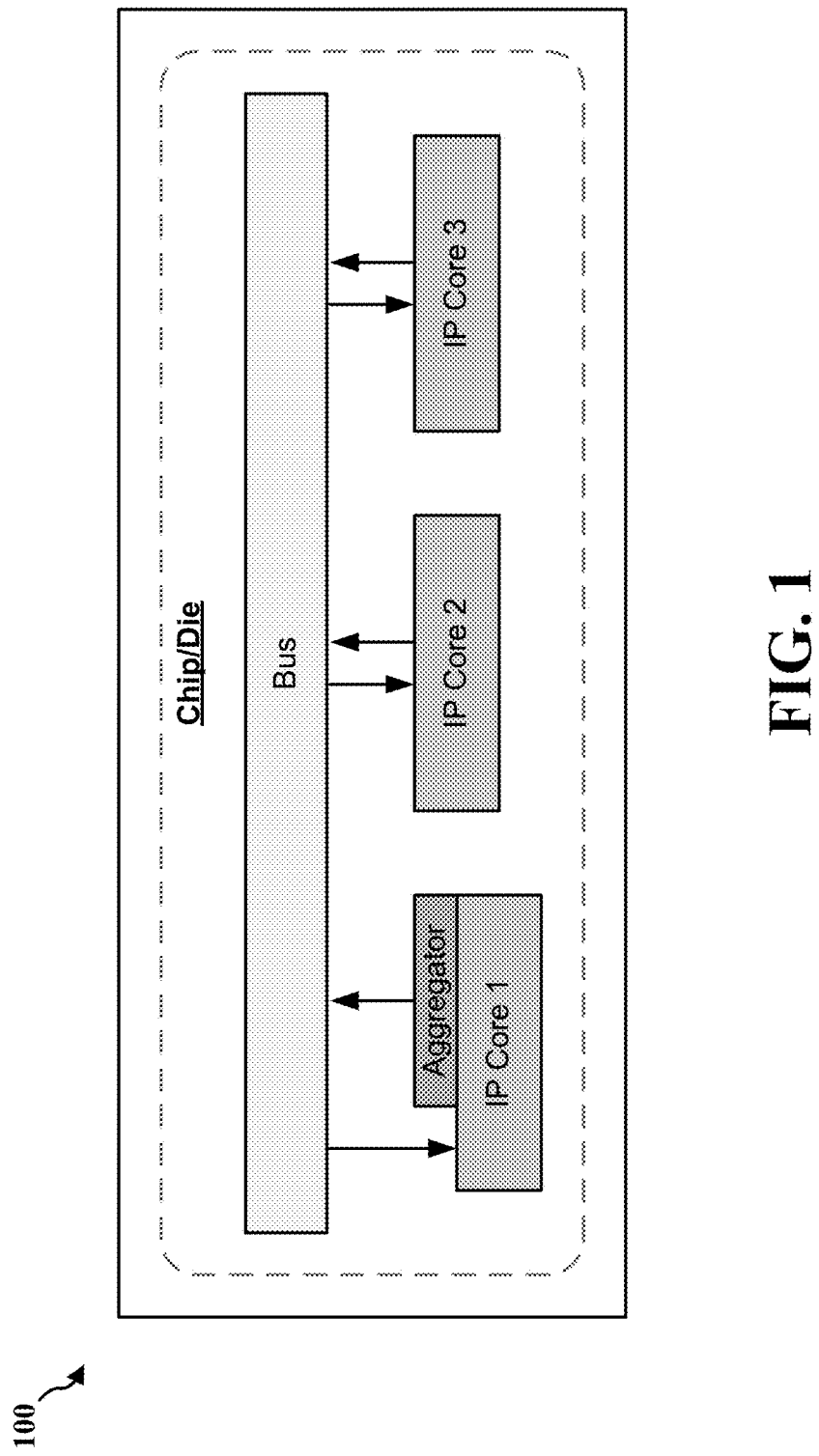
FIG. 1 is a diagram illustrating a core to core aggregation implementation.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The schemes for aggregating data sets described herein find application in various use scenarios. For example, FIG. 1 is a diagram illustrating a core to core aggregation implementation 100. In this use case, common chip implementations include several cores on the same die which are connected via a shared bus/Fabric/Network-On-Chip (NOC). Adding an aggregator in accordance with the schemes set forth below to IP Core 1 can reduce the number of packets that IP Core 1 sends on the bus/Fabric/NOC thus improving the bus's utilization. It is possible to add an aggregator to one or more cores.

Figure 2:
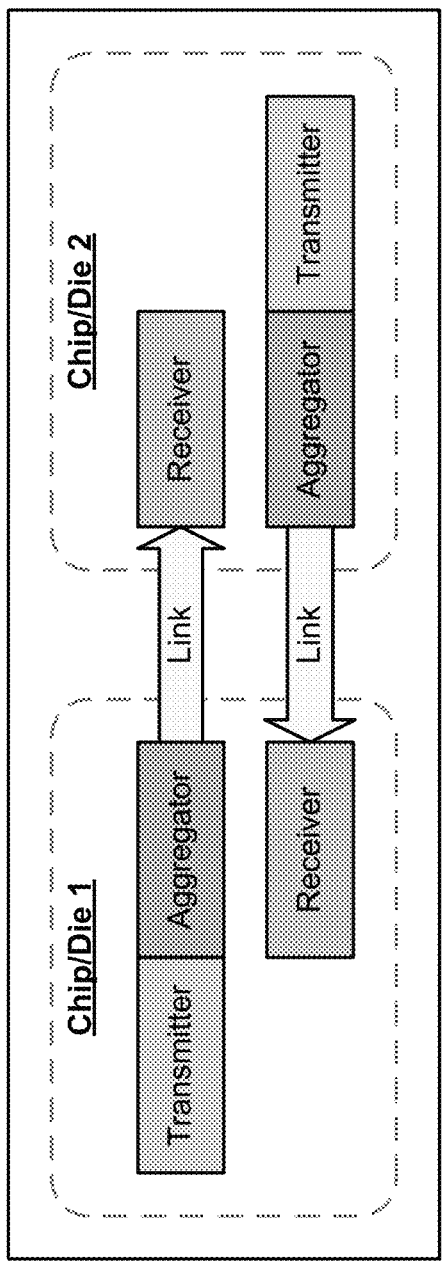
FIG. 2 is a diagram illustrating a chip-to-chip aggregation implementation.

FIG. 2 is a diagram illustrating a chip-to-chip aggregation implementation 200. In this use case, a common system implementation achieves chip-to-chip communication by connecting two dies (or chips) using a dedicated link. In such implementations, it is possible to add an aggregator to one or both chips. Usage of an aggregator in accordance with the schemes set forth below can improve the link utilization, thus reducing power consumption and increasing the effective communication speed. This is applicable if the two chips are in the same package, as illustrated in FIG. 2, or if the chips are on different packages, connected on the same board (not shown).

Figure 3:
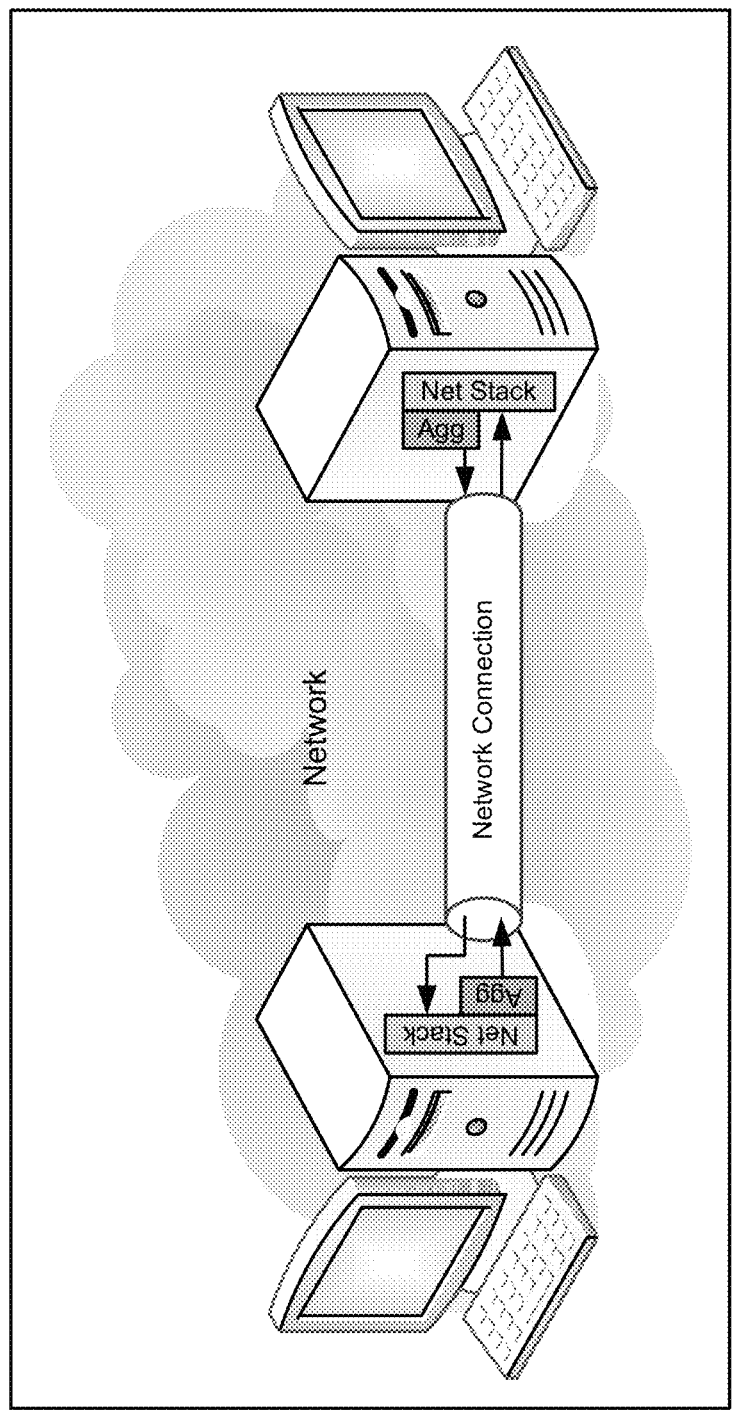
FIG. 3 is a diagram illustrating a machine-to-machine aggregation implementation.

FIG. 3 is a diagram illustrating a machine-to-machine aggregation implementation 300. In this use case, machine-to-machine communication is commonly implemented using logical channels. Adding an aggregator in accordance with the schemes set forth below to each logical channel may reduce the total number of packets in the network resulting in lower overhead and better network utilization.

Figure 4:
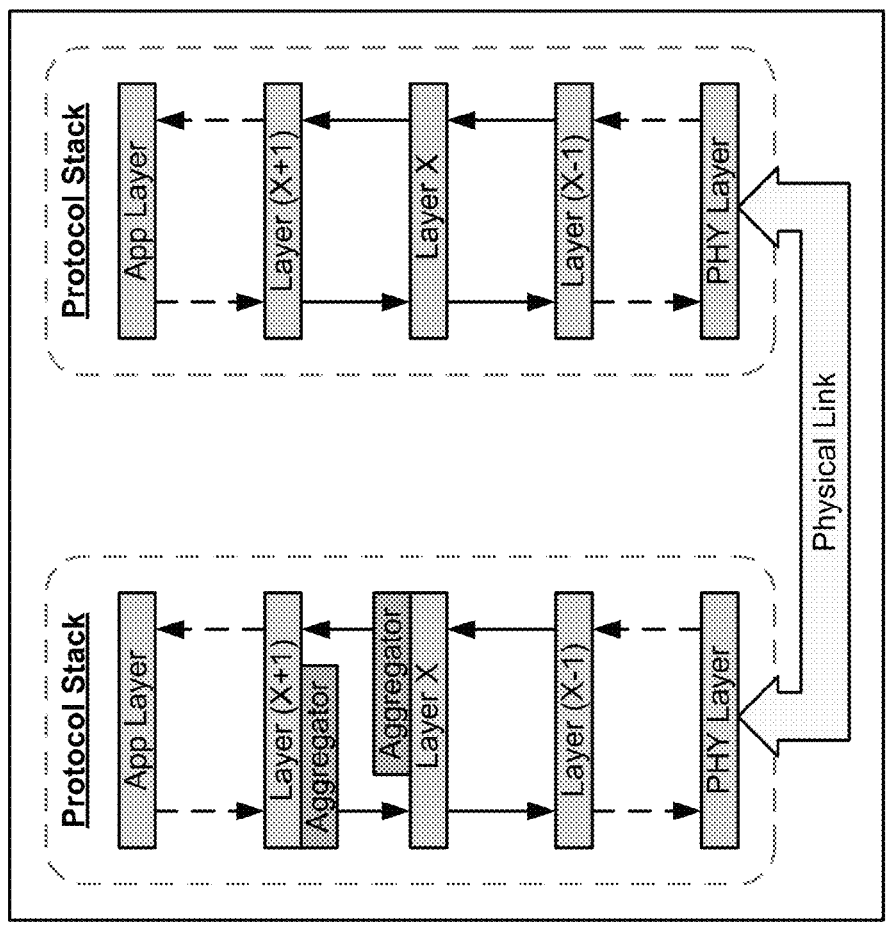
FIG. 4 is a diagram illustrating an implementation having aggregation between protocol stack layers.

FIG. 4 is a diagram illustrating an implementation 400 having aggregation between protocol stack layers. In this use case, common protocol stack implementation (e.g. a TCP/IP stack) involves data movement between the protocol's layers. Adding an aggregator in accordance with the schemes set forth below in Layer X+1 before sending data to layer X may reduce the number of function invocations. The aggregator can be added in both software and hardware implementations.

Focusing on the use case of FIG. 4, details of aggregation schemes are described below within the context of wireless communication systems employing protocol stack layers.

Such wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. An example of an emerging telecommunication standard is Long Term Evolution (LTE).

Figure 5:
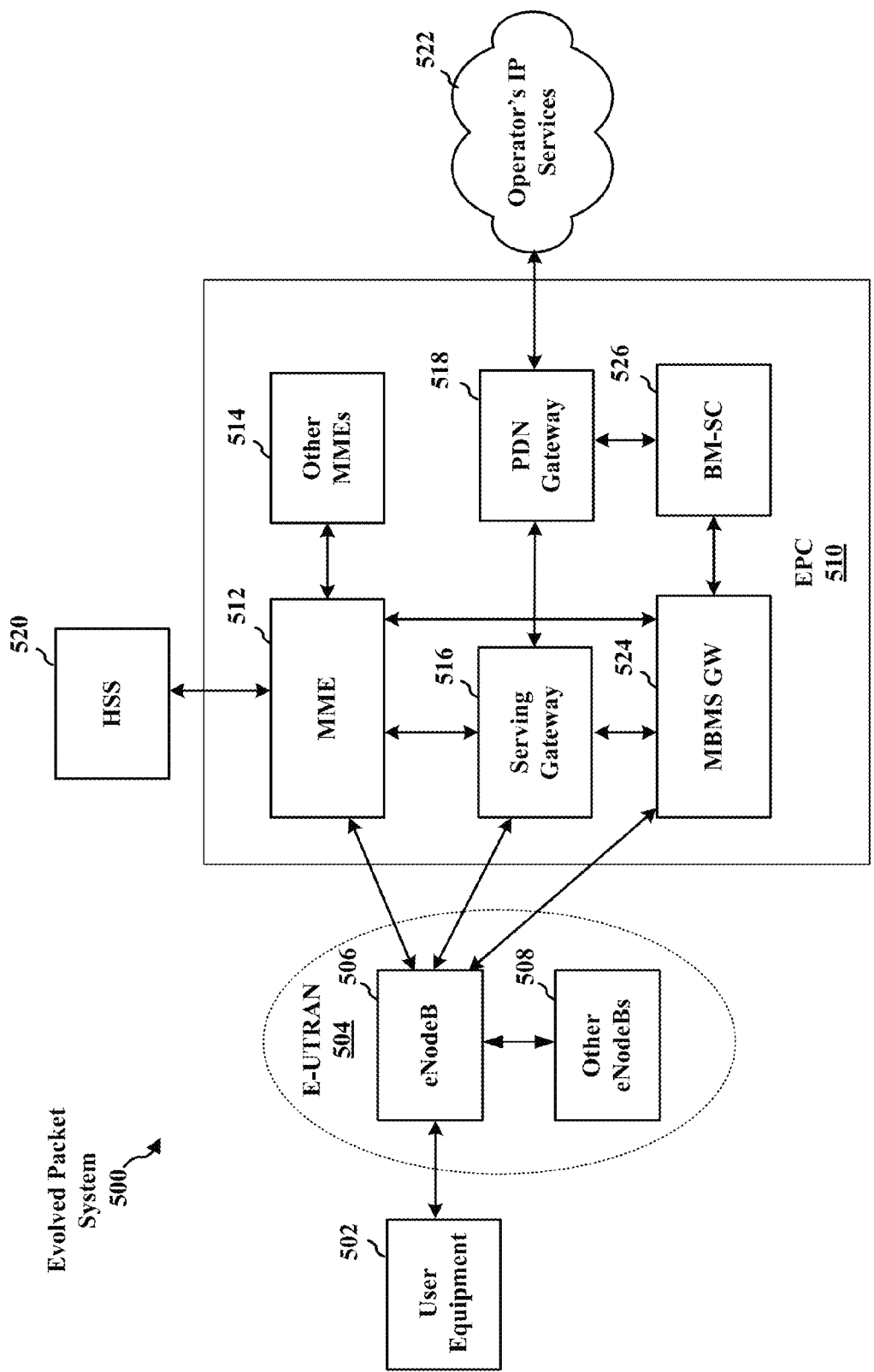
FIG. 5 is a diagram illustrating an example of a network architecture.

FIG. 5 is a diagram illustrating a LTE network architecture 500. The LTE network architecture 500 may be referred to as an Evolved Packet System (EPS) 500. The EPS 500 may include one or more user equipment (UE) 502, an Evolved UMTS Terrestrial Radio Access Network (E-UTRAN) 504, an Evolved Packet Core (EPC) 510, a Home Subscriber Server (HSS) 520, and an Operator's Internet Protocol (IP) Services 522. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 506 and other eNBs 508. The eNB 506 provides user and control planes protocol terminations toward the UE 502. The eNB 506 may be connected to the other eNBs 508 via a backhaul (e.g., an X2 interface). The eNB 506 may also be referred to as a base station, a base transceiver station, a radio base station, a radio transceiver, a transceiver function, a basic service set (BSS), an extended service set (ESS), or some other suitable terminology. The eNB 506 provides an access point to the EPC 510 for a UE 502. Examples of UEs 502 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 502 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 506 is connected to the EPC 510. The EPC 510 includes a Mobility Management Entity (MME) 512, other MMEs 514, a Serving Gateway 516, a Multimedia Broadcast Multicast Service (MBMS) Gateway 524, a Broadcast Multicast Service Center (BM-SC) 526, and a Packet Data Network (PDN) Gateway 518. The MME 512 is the control node that processes the signaling between the UE 502 and the EPC 510. Generally, the MME 512 provides bearer and connection management. All user IP packets are transferred through the Serving Gateway 516, which itself is connected to the PDN Gateway 518. The PDN Gateway 518 provides UE IP address allocation as well as other functions. The PDN Gateway 518 is connected to the Operator's IP Services 522. The Operator's IP Services 522 may include the Internet, an intranet, an IP Multimedia Subsystem (IMS), and a PS Streaming Service (PSS). The BM-SC 526 is the source of MBMS traffic. The MBMS Gateway 524 distributes the MBMS traffic to the eNBs 506, 508.

Figure 6:
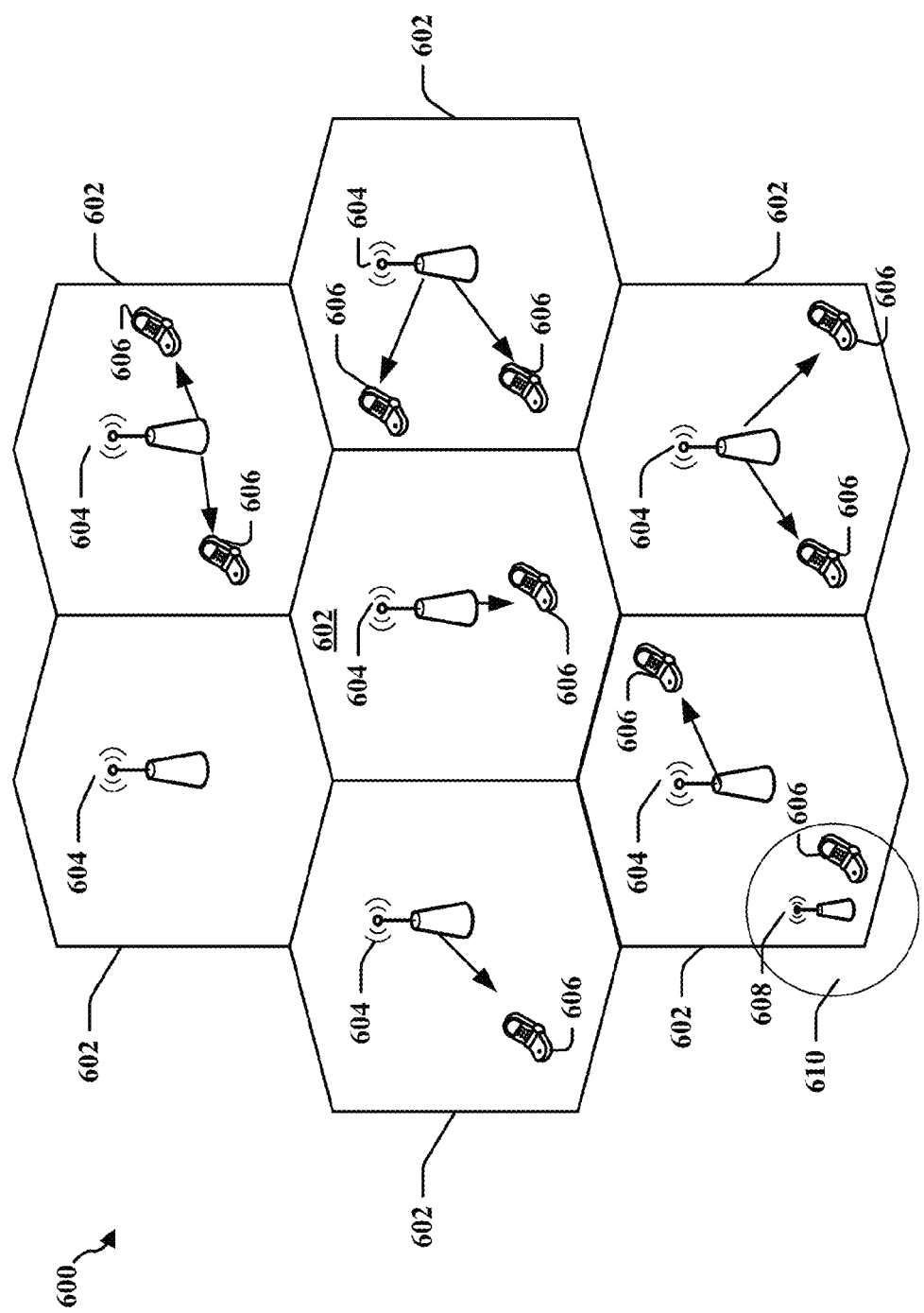
FIG. 6 is a diagram illustrating an example of an access network.

FIG. 6 is a diagram illustrating an example of an access network 600 in a LTE network architecture. In this example, the access network 600 is divided into a number of cellular regions (cells) 602. One or more lower power class eNBs 608 may have cellular regions 610 that overlap with one or more of the cells 602. The lower power class eNB 608 may be a femto cell (e.g., home eNB (HeNB)), pico cell, micro cell, or remote radio head (RRH). The macro eNBs 604 are each assigned to a respective cell 602 and are configured to provide an access point to the EPC 510 for all the UEs 606 in the cells 602. There is no centralized controller in this example of an access network 600, but a centralized controller may be used in alternative configurations. The eNBs 604 are responsible for all radio related functions including radio bearer control, admission control, mobility control, scheduling, security, and connectivity to the serving gateway 516.

The modulation and multiple access scheme employed by the access network 600 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 604 may have multiple antennas supporting MIMO technology. The use of MIMO technology enables the eNBs 604 to exploit the spatial domain to support spatial multiplexing, beamforming, and transmit diversity. Spatial multiplexing may be used to transmit different streams of data simultaneously on the same frequency. The data steams may be transmitted to a single UE 606 to increase the data rate, or to multiple UEs 606 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 606 with different spatial signatures, which enables each of the UE(s) 606 to recover the one or more data streams destined for that UE 606. On the UL, each UE 606 transmits a spatially precoded data stream, which enables the eNB 604 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 7:
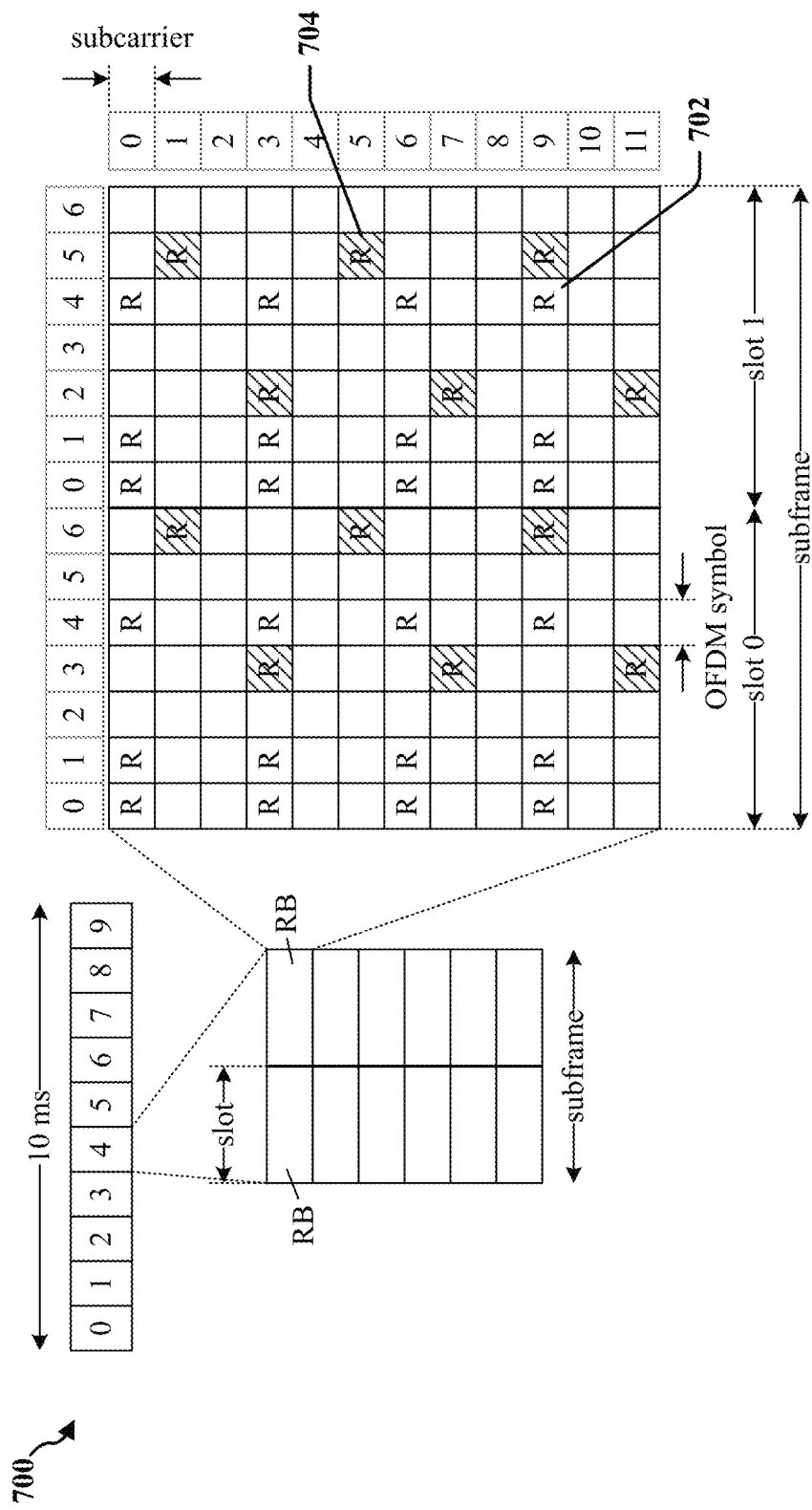
FIG. 7 is a diagram illustrating an example of a DL frame structure in LTE.

FIG. 7 is a diagram 700 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 702, 704, include DL reference signals (DL-RS). The DL-RS include Cell-specific RS (CRS) (also sometimes called common RS) 702 and UE-specific RS (UE-RS) 704. UE-RS 704 is transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 8:
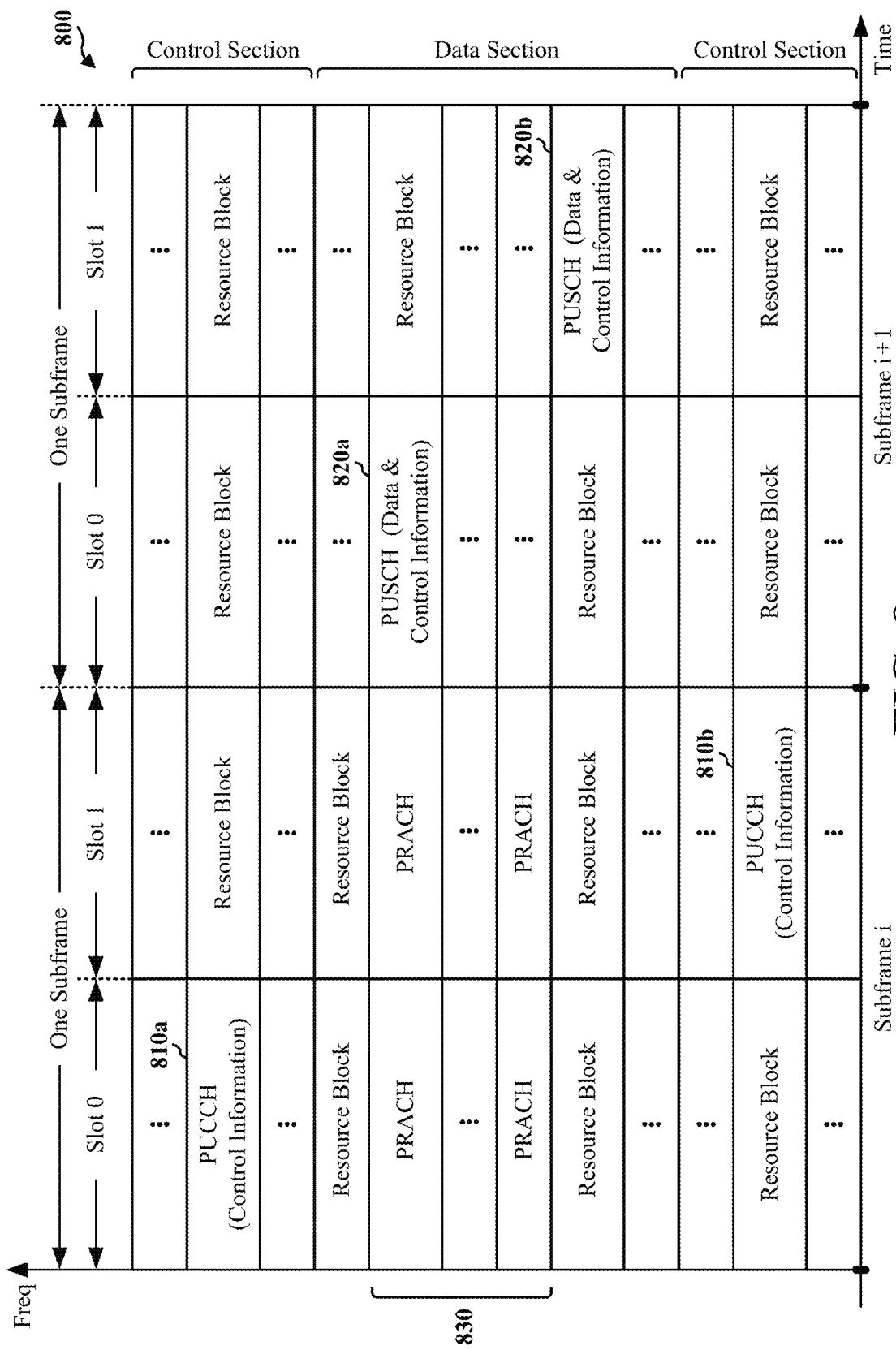
FIG. 8 is a diagram illustrating an example of an UL frame structure in LTE.

FIG. 8 is a diagram 800 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 810*a*, 810*b* in the control section to transmit control information to an eNB. The UE may also be assigned resource blocks 820*a*, 820*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 830. The PRACH 830 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 9:
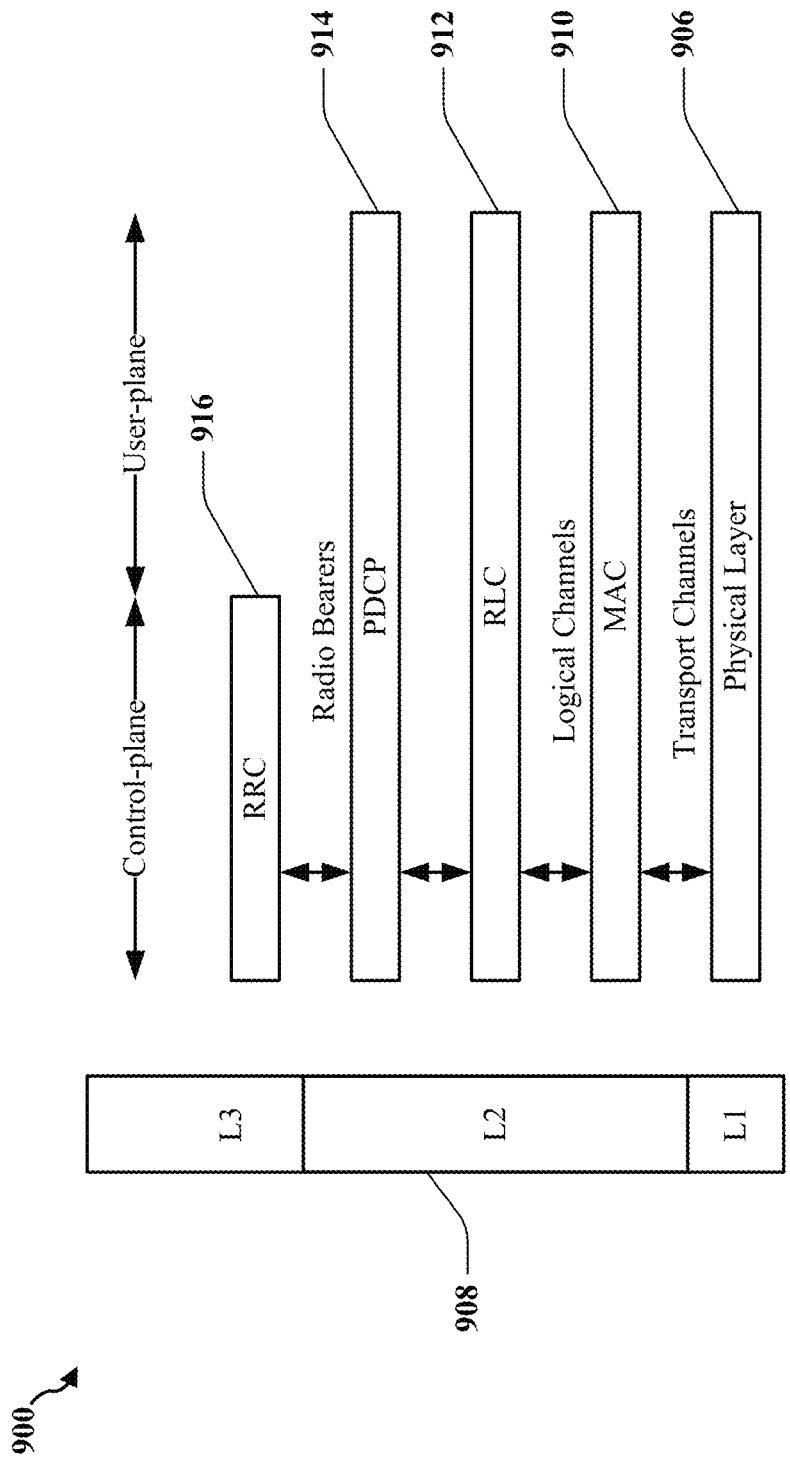
FIG. 9 is a diagram illustrating an example of a radio protocol architecture for the user and control planes.

FIG. 9 is a diagram 900 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 906. Layer 2 (L2 layer) 908 is above the physical layer 906 and is responsible for the link between the UE and eNB over the physical layer 906.

In the user plane, the L2 layer 908 includes a media access control (MAC) sublayer 910, a radio link control (RLC) sublayer 912, and a packet data convergence protocol (PDCP) 914 sublayer, which are terminated at the eNB on the network side. Although not shown, the UE may have several upper layers above the L2 layer 908 including a network layer (e.g., IP layer) that is terminated at the PDN gateway 518 (FIG. 5) on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between eNBs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

In the control plane, the radio protocol architecture for the UE and eNB is substantially the same for the physical layer 906 and the L2 layer 908 with the exception that there is no header compression function for the control plane. The control plane also includes a radio resource control (RRC) sublayer 916 in Layer 3 (L3 layer). The RRC sublayer 916 is responsible for obtaining radio resources (i.e., radio bearers) and for configuring the lower layers using RRC signaling between the eNB and the UE.

Figure 10:
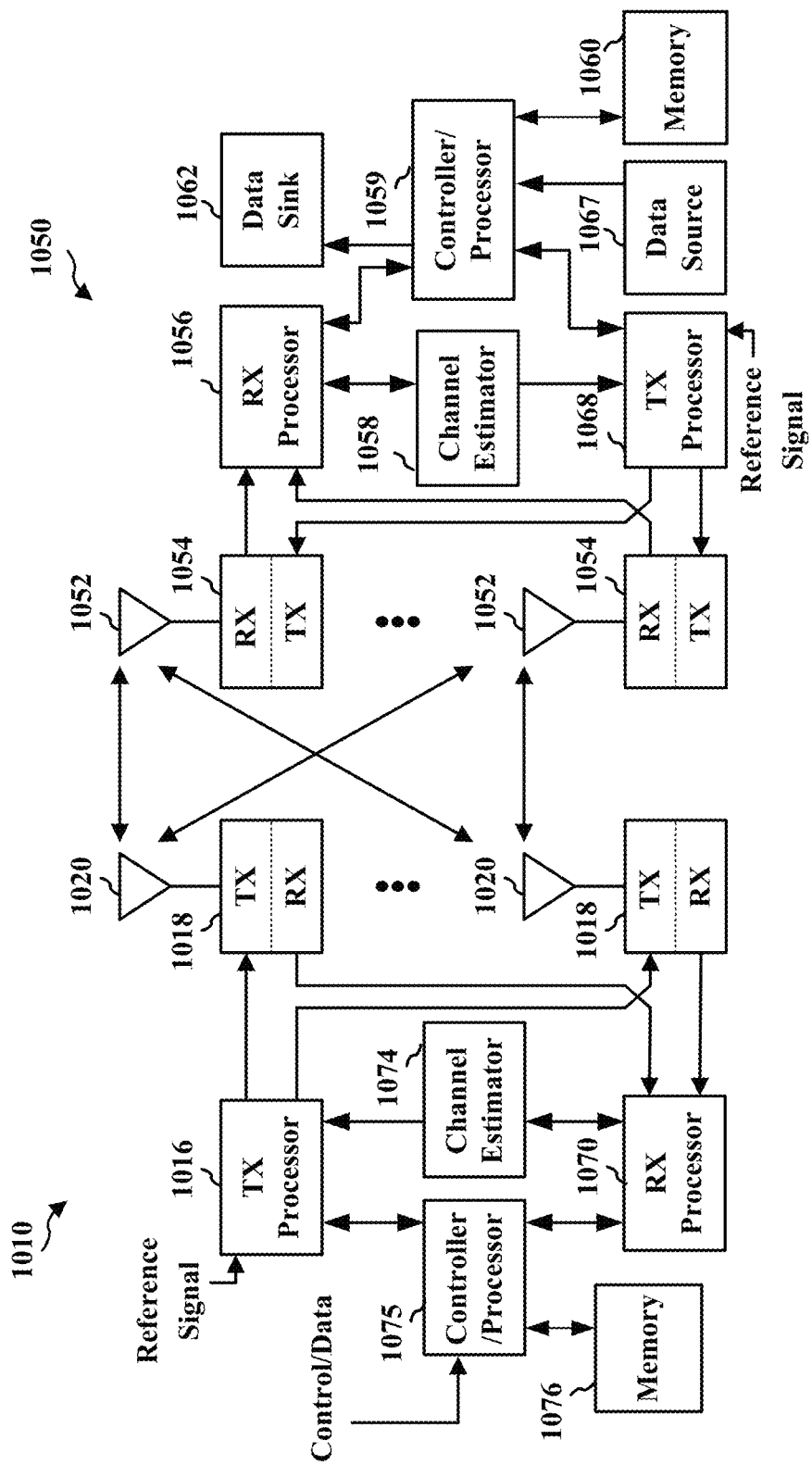
FIG. 10 is a diagram illustrating an example of an evolved Node B and user equipment in an access network.

FIG. 10 is a block diagram of an eNB 1010 in communication with a UE 1050 in an access network. In the DL, upper layer packets from the core network are provided to a controller/processor 1075. The controller/processor 1075 implements the functionality of the L2 layer. In the DL, the controller/processor 1075 provides header compression, ciphering, packet segmentation and reordering, multiplexing between logical and transport channels, and radio resource allocations to the UE 1050 based on various priority metrics. The controller/processor 1075 is also responsible for HARQ operations, retransmission of lost packets, and signaling to the UE 1050.

The transmit (TX) processor 1016 implements various signal processing functions for the L1 layer (i.e., physical layer). The signal processing functions include coding and interleaving to facilitate forward error correction (FEC) at the UE 1050 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1074 may be used to determine the coding and modulation scheme, as well as for spatial processing. The channel estimate may be derived from a reference signal and/or channel condition feedback transmitted by the UE 1050. Each spatial stream is then provided to a different antenna 1020 via a separate transmitter 1018TX. Each transmitter 1018TX modulates an RF carrier with a respective spatial stream for transmission.

At the UE 1050, each receiver 1054RX receives a signal through its respective antenna 1052. Each receiver 1054RX recovers information modulated onto an RF carrier and provides the information to the receive (RX) processor 1056. The RX processor 1056 implements various signal processing functions of the L1 layer. The RX processor 1056 performs spatial processing on the information to recover any spatial streams destined for the UE 1050. If multiple spatial streams are destined for the UE 1050, they may be combined by the RX processor 1056 into a single OFDM symbol stream. The RX processor 1056 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 1010. These soft decisions may be based on channel estimates computed by the channel estimator 1058. The soft decisions are then decoded and deinterleaved to recover the data and control signals that were originally transmitted by the eNB 1010 on the physical channel. The data and control signals are then provided to the controller/processor 1059.

The controller/processor 1059 implements the L2 layer. The controller/processor can be associated with a memory 1060 that stores program codes and data. The memory 1060 may be referred to as a computer-readable medium. In the UL, the controller/processor 1059 provides demultiplexing between transport and logical channels, packet reassembly, deciphering, header decompression, control signal processing to recover upper layer packets from the core network. The upper layer packets are then provided to a data sink 1062, which represents all the protocol layers above the L2 layer. Various control signals may also be provided to the data sink 1062 for L3 processing. The controller/processor 1059 is also responsible for error detection using an acknowledgement (ACK) and/or negative acknowledgement (NACK) protocol to support HARQ operations.

In the UL, a data source 1067 is used to provide upper layer packets to the controller/processor 1059. The data source 1067 represents all protocol layers above the L2 layer. Similar to the functionality described in connection with the DL transmission by the eNB 1010, the controller/processor 1059 implements the L2 layer for the user plane and the control plane by providing header compression, ciphering, packet segmentation and reordering, and multiplexing between logical and transport channels based on radio resource allocations by the eNB 1010. The controller/processor 1059 is also responsible for HARQ operations, retransmission of lost packets, and signaling to the eNB 1010.

Channel estimates derived by a channel estimator 1058 from a reference signal or feedback transmitted by the eNB 1010 may be used by the TX processor 1068 to select the appropriate coding and modulation schemes, and to facilitate spatial processing. The spatial streams generated by the TX processor 1068 are provided to different antenna 1052 via separate transmitters 1054TX. Each transmitter 1054TX modulates an RF carrier with a respective spatial stream for transmission.

The UL transmission is processed at the eNB 1010 in a manner similar to that described in connection with the receiver function at the UE 1050. Each receiver 1018RX receives a signal through its respective antenna 1020. Each receiver 1018RX recovers information modulated onto an RF carrier and provides the information to a RX processor 1070. The RX processor 1070 may implement the L1 layer.

The controller/processor 1075 implements the L2 layer. The controller/processor 1075 can be associated with a memory 1076 that stores program codes and data. The memory 1076 may be referred to as a computer-readable medium. In the UL, the control/processor 1075 provides demultiplexing between transport and logical channels, packet reassembly, deciphering, header decompression, control signal processing to recover upper layer packets from the UE 1050. Upper layer packets from the controller/processor 1075 may be provided to the core network. The controller/processor 1075 is also responsible for error detection using an ACK and/or NACK protocol to support HARQ operations.

As mention above, in communication systems, a communication link is comprised of a transmit entity and a receive entity. There may be more than one entity of each kind and entities might switch roles. Every transmit operation incurs some overhead per transmitted data, that is caused by the handling, encoding and physical transmission of each transmitted bit. In many communication systems the transmitted data is divided into discrete data sets, also referred to herein as packets or frames. The use of one term over the other is not intended to limit the scope of applicability of the methods and apparatuses described herein. In such cases there is usually a transmit overhead which is incurred per transmitted packet. It is desirable to minimize the accumulated transmit overhead.

There are various types of per-packet overhead, including:

Connection initialization/Training sequence: a predefined sequence known to both transmitter and receiver, used for link training (e.g. equalization), clock synchronization, packet synchronization etc. Depending on implementation, such a training sequence might be required before each packet transmission.

Shared-media access: in an exemplary shared-media interconnect architectures (e.g. Bus/Fabric/Network-On-Chip—NOC) the shared media may have to be owned exclusively by a single transmitter for the whole packet transmission period. Alternatively, in some architectures, several "master" transmitters may jointly own the shared media and transmit data to several "slave" receivers at the same time. In either case, each attempt by a transmitter to gain either exclusive or shared ownership of the shared media consumes time even if the attempt fails. In a shared-media architecture, a successful attempt to obtain ownership is required before transmission of a packet.

Negotiation: some protocols require the transmitter to alert the receiver that a packet transmission is about to begin/end by transmitting predefined packet/frame/sequence. These are commonly known as "start of transaction" (or "preamble") and "end of transaction".

Data overhead: some protocols require information to be added to the data in each packet. This data can include packet type, packet length, data checksum, addresses (sender/receiver) etc. Such data is usually included in a "packet header".

Receiver processing: each received packet has to be processed by the receiver. Some implementations require processing overhead per packet that can be agnostic to packet length.

Method invocation/API calls: in some software implementations of protocol stacks, each packet is moved from one layer to another by method-invocation (calling an API function). Such invocation is sometimes done per packet, and adds specific processing overhead per packet handled.

Methods and apparatuses described below address the problems described above based on the following assumptions: First, overhead in the communication system may be correlated to the number of packets rather than with packet size, or correlated to packet size rather than number of packets, or correlated to both packet size and number of packets. Overhead correlated to the number of packets is reduced by controlling the number of packets transmitted. In one configuration, the number of packets transmitted is based on estimated arrival times of packets. In another configuration, the number of packets transmitted is based on estimated sizes of packets. Second, network parameters (e.g. link speed, capacity, load, etc) may be substantially consistent or may change with time. In the case of a network that behaves in a consistent way (e.g. every packet arrives in a constant interval and with constant size) the methods, apparatuses and estimation algorithms described below function to provide substantially perfect estimations of time and size after processing several packets. In the case of a network with parameters that change with time, such changes themselves are assumed consistent for at least some interval of time (e.g. a cellular network UE moves from "poor reception" to "good reception") as opposed, for example, to a network in which every packet arrives at a random interval and with random size. In such network wherein changes are assumed consistent for at least some interval of time, the methods, apparatuses and estimation algorithms described below function to detect, handle and optimize for such changes.

Figure 11:
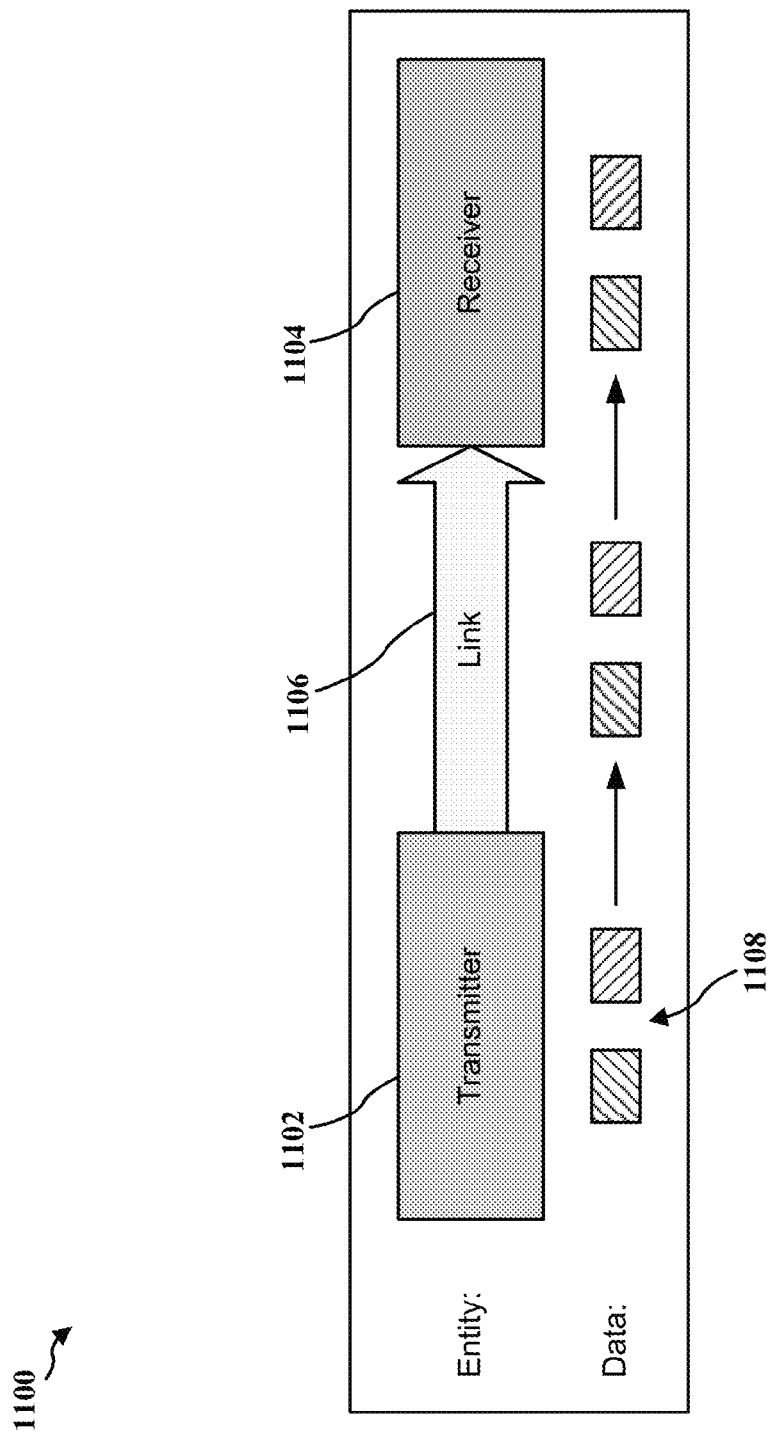
FIG. 11 is a diagram illustrating a communication system transmitting non-aggregated data sets.

FIG. 11 illustrates a communication system 1100 including a transmitter 1102, a receiver 1104 and a communication link 1106. Two data sets 1108 or "packets" are separately generated in the transmitter 1102, separately transferred on the link 1106, and separately received at the receiver 1104. Transmitting two packets using this system incurs a packet-transmit-overhead (PTO) of (2*PTO).

Figure 12:
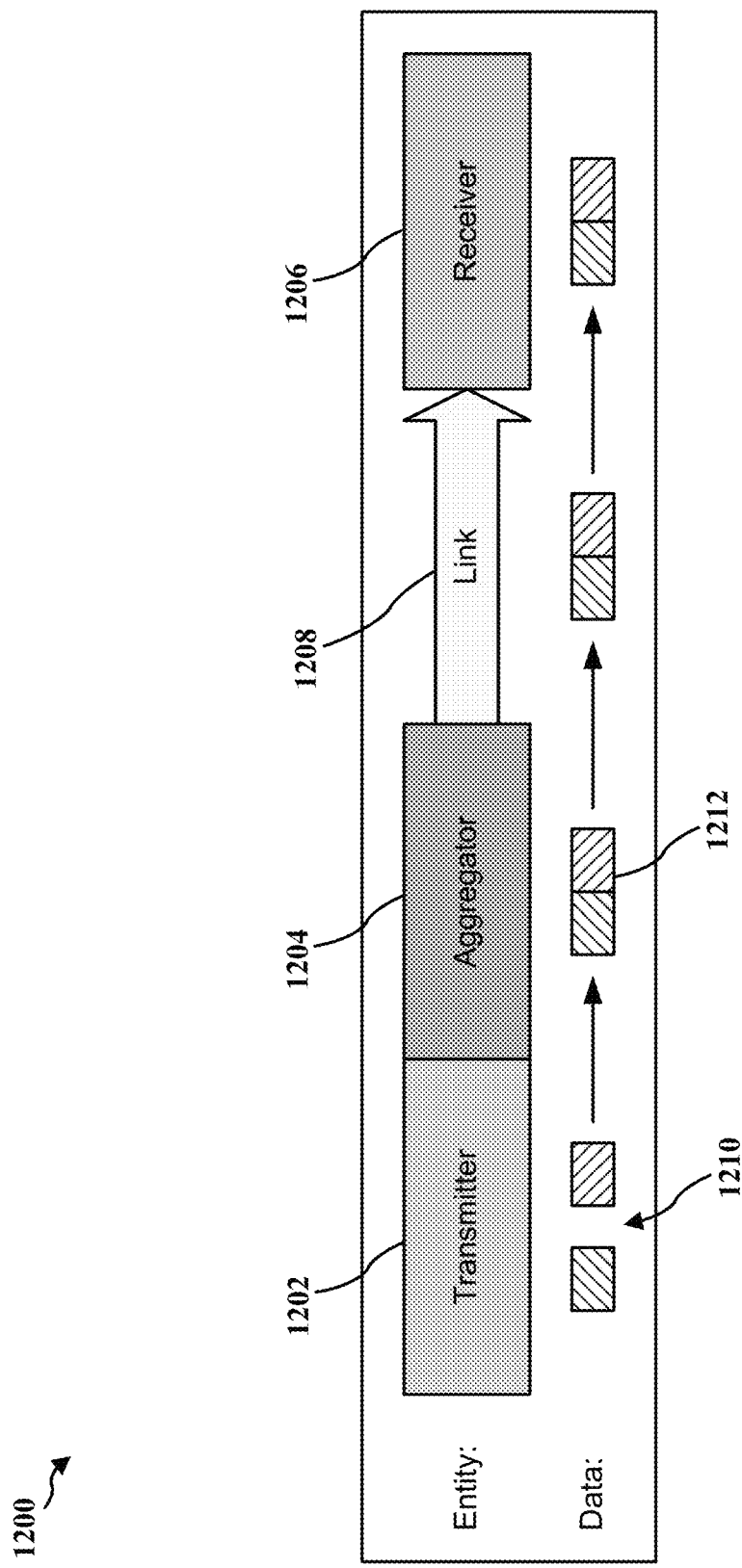
FIG. 12 is a diagram illustrating a communication system transmitting aggregated data sets.

FIG. 12 illustrates a communication system 1200 including a transmitter 1202, an aggregator 1204, a receiver 1206 and one connection link 1208. Two packets 1210 are separately generated in the transmitter 1208. The two packets 1210 are then combined by the aggregator 1204 into one aggregated packet 1212. The aggregated packet 1212 is transferred on the link 1208 and received at the receiver 1206. Transmitting two separate packets 1210 using this system incurs an overhead of PTO, since only one aggregated packet 1212 was actually transmitted. Therefore, it is noted that the same amount of data was transferred as in FIG. 11, but with less (in this example, half) the overhead.

Following are examples of "static aggregation" for several different packet arrival-time-intervals. "Static aggregation" as used herein corresponds to aggregation processes involving parameters that remain generally fixed or that change in a predetermined or predefined way, independent of any process feedback. In other words, static aggregation process may be characterized as non-dynamic or non-adaptive. In contrast, the "dynamic aggregation" processes described further below involve parameters that change or adapt based on continuous monitoring and processing of preceding aggregation measurements and parameters. The following general assumptions apply to these static aggregation exemplary scenarios:

1. The maximum allowed delay per packet is 6 ms. Assume that the static algorithm always waits for 6 ms before sending the aggregated packets.

2. The line (transmit delay) is zero. This simplifies the examples below; it does not change the algorithm.

3. "Arrival Time" corresponds to the time in which the packet arrives to the aggregator.

4. "Delay" corresponds to the time that the packet was delayed before it was transmitted by the transmitter.

Table 1 below corresponds to static aggregation performed under a first scenario wherein a single packet is received every 2 ms.

TABLE 1

| Packet ID | Arrival Time | Aggregation timeout | Action | Delay |
|---|---|---|---|---|
| 1 | 2 | 8 | Aggregate | 6 |
| 2 | 4 | 8 | Aggregate | 4 |
| 3 | 6 | 8 | Aggregate | 2 |
| 4 | 8 | 8 | Send | 0 |
| 5 | 10 | 16 | Aggregate | 6 |
| 6 | 12 | 16 | Aggregate | 4 |
| 7 | 14 | 16 | Aggregate | 2 |
| 8 | 16 | 16 | Send | 0 |

Total packets arrived: 8
Total packets sent: 2
Average delay per packet: 3.0

Table 2 below corresponds to static aggregation performed under a second scenario wherein a single packet is received every 7 ms.

TABLE 2

| Packet ID | Arrival Time | Aggregation timeout | Action | Delay |
|---|---|---|---|---|
| 1 | 7 | 13 | Aggregate, send at timeout | 6 |
| 2 | 14 | 20 | Aggregate, send at timeout | 6 |
| 3 | 21 | 27 | Aggregate, send at timeout | 6 |
| 4 | 28 | 34 | Aggregate, send at timeout | 6 |
| 5 | 35 | 41 | Aggregate, send at timeout | 6 |
| 6 | 42 | 48 | Aggregate, send at timeout | 6 |
| 7 | 49 | 55 | Aggregate, send at timeout | 6 |
| 8 | 56 | 62 | Aggregate, send at timeout | 6 |

Total packets arrived: 8
Total packets sent: 8
Average delay per packet: 6.0

Table 3 below corresponds to static aggregation performed under a third scenario wherein packets are received in short bursts of varying time intervals.

TABLE 3

| Packet ID | Arrival Time | Aggregation timeout | Action | Delay |
|---|---|---|---|---|
| 1 | 3 | 9 | Aggregate | 6 |
| 2 | 5 | 9 | Aggregate | 4 |
| 3 | 7 | 9 | Aggregate, send at timeout | 2 |
| 4 | 10 | 16 | Aggregate | 6 |
| 5 | 15 | 16 | Aggregate, send at timeout | 1 |
| 6 | 22 | 28 | Aggregate | 6 |
| 7 | 28 | 28 | Send | 0 |
| 8 | 33 | 39 | Aggregate | 6 |
| 9 | 37 | 39 | Aggregate, send at timeout | 2 |
| 10 | 40 | 46 | Aggregate | 6 |
| 11 | 44 | 46 | Aggregate, send at timeout | 2 |
| 12 | 49 | 55 | Aggregate | 6 |
| 13 | 52 | 55 | Aggregate, send at timeout | 3 |
| 14 | 59 | 65 | Aggregate, send at timeout | 6 |
| 15 | 67 | 73 | Aggregate | 6 |
| 16 | 73 | 73 | Send | 0 |

Total packets arrived: 16
Total packets sent: 8
Average delay per packet: 3.875

Figure 13:
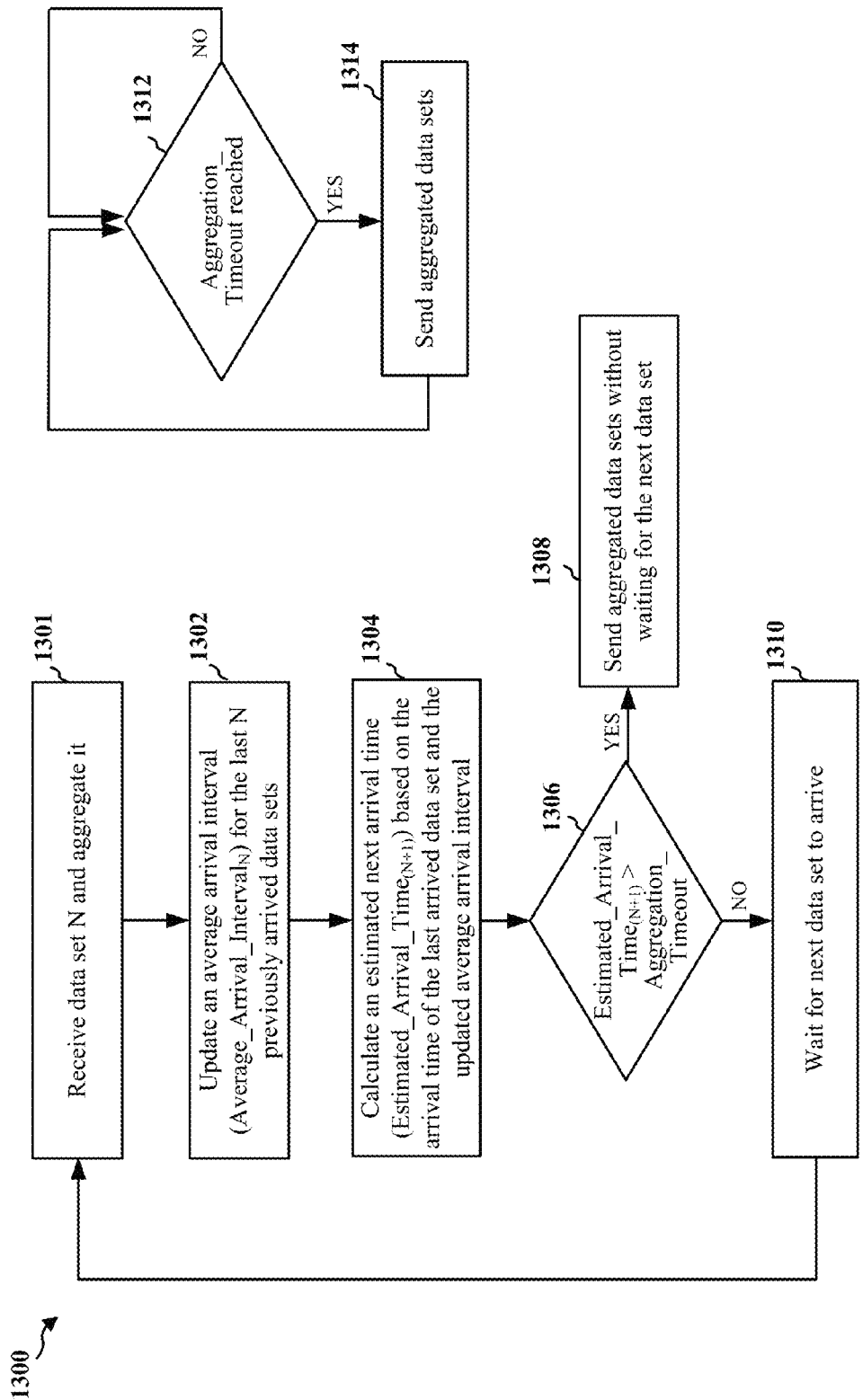
FIG. 13 is a flow chart of a method of dynamic aggregation.

FIG. 13 is a flow chart 1300 of a method of "dynamic aggregation". As described above, "dynamic aggregation" processes involve parameters that change or adapt based on continuous monitoring and processing of preceding aggregation measurements and parameters. This is in contrast to the "static aggregation" techniques described above, where aggregation parameters do not adapt or change in response to preceding aggregation measurements and parameters. The method and process of FIG. 13 may be executed in any aggregator, such as those described above with respect to FIGS. 1, 2, 3 and 4. In step 1301 a data set arrives and is aggregated. In step 1302, an average arrival interval (Average_Arrival_Interval$_N$) is updated for a number (N) of previously arrived data sets. In one configuration, an average arrival interval corresponds to the average of the arrival intervals times of the last N arrived data sets. For example, if N=3, then:

Average_Arrival_Interval$_1$=Arrival_Interval$_1$

Average_Arrival_Interval$_2$=(Arrival_Interval$_1$+Arrival_Interval$_2$)/2

Average_Arrival_Interval$_3$=(Arrival_Interval$_1$+Arrival_Interval$_2$+Arrival_Interval$_3$)/3

In general form:

Average_Arrival_Interval$_N$=(Arrival_Interval$_1$+Arrival_Interval$_2$+ . . . +Arrival_Interval$_N$)/N At step 1304, an estimated next arrival time (Estimated_Arrival_Time$_{(N+1)}$) is calculated for the next data set (N+1) based on the arrival time of the last arrived data set (N) and the updated average arrival interval of the last N data sets. The estimated arrival time corresponds to the estimated time at which the next data set will arrive. The estimated arrival time may be derived as follows:

Estimated_Arrival_Time$_{(N+1)}$=Arrival_Time$_N$+Average_Arrival_Interval$_N$

For example, the estimated arrival time of data set #4 is the arrival time of data set #3 plus the average arrival interval calculated for the last 3 data sets (1, 2 and 3) for N=3. If the last packet #50 arrived at time "10000" and the Average_Arrival_Interval is "2", then the next packet (#51) is estimated to arrive at time "10002". At step 1306, the calculated estimated arrival time of the next data set (N+1) is compared to an aggregation timeout (Aggregation_Timeout). The aggregation timeout corresponds to the time at which the aggregated data sets must be sent, so that the first aggregated data set will not be delayed more than a maximum aggregation delay (Max_Aggregation_Delay). The aggregation timeout is derived as follows:

$$\text{Aggregation\_Timeout} = \text{Arrival\_Time}_{First\_aggrregated\_data\_set} + \text{Max\_Aggregation\_Delay},$$

where Max_Aggregation_Delay is the maximum delay that the aggregation can add per data set before sending it. Max_Aggregation_Delay is typically a system/network parameter preset per system/network. Aggregated data sets are delayed in an aggregator before being sent, for a maximal period that should not be exceeded or there might be some adverse effect, e.g. on data latency, system responsiveness, user experience etc. The process described herein aggregates as many data sets as possible but does not wait for a next data set if it is estimated to arrive after the Max_Aggregation_Delay, as there is no benefit in waiting and system/network performance is improved if the aggregated data sets are sent immediately. In the examples demonstrated below, Max_Aggregation_Delay=6 ms.

Continuing with step 1306, if the estimated arrival time of the next data set exceeds the aggregation time out, in other words, the next data set is estimated to arrive after the aggregation timeout, the process proceeds to step 1308 where the aggregated data sets are sent without waiting for the next data set to arrive. If, however, at step 1306, the estimated arrival time of the next data set does not exceed the aggregation time out, then at step 1310, the process proceeds to wait for the next data set to arrive. When the next data set arrives, the process returns to step 1301 where the process is repeated for a subsequent, next data set.

To verify that the Aggregation_Timeout is not exceeded an independent process handles step 1312 in which it is determined whether the aggregation timeout was reached. This independent process is essentially a loop that continuously checks for a timeout. If a timeout is reached, the process proceeds to step 1314 in which the aggregated data is sent. If a timeout is not reached, the process returns to step 1312. The independent loop process ensures that the Aggregation_Timeout is honored in cases where an estimation is missed and the next data set arrives after the estimated time.

The number chosen for N is a system/network parameter. N could be a small number, e.g., 3 to 10, in usual cases, but may be chosen empirically for a specific system/network.

Table 4 below corresponds to the results of dynamic aggregation performed under the first scenario above, wherein a single packet is received every 2 ms.

TABLE 4

| Packet ID | Arrival time | Average arrival interval | Estimated next arrival time | Aggregation timeout | Action | Delay |
|---|---|---|---|---|---|---|
| 1 | 2 | 2.0 | 4.0 | 8 | Aggregate | 6 |
| 2 | 4 | 2.0 | 6.0 | 8 | Aggregate | 4 |
| 3 | 6 | 2.0 | 8.0 | 8 | Aggregate | 2 |
| 4 | 8 | 2.0 | 10.0 | 8 | Send | 0 |
| 5 | 10 | 2.0 | 12.0 | 16 | Aggregate | 6 |
| 6 | 12 | 2.0 | 14.0 | 16 | Aggregate | 4 |
| 7 | 14 | 2.0 | 16.0 | 16 | Aggregate | 2 |
| 8 | 16 | 2.0 | 18.0 | 16 | Send | 0 |

Total packets arrived: 8
Total packets sent: 2
Average delay per packet: 3.0

Table 5 below corresponds to dynamic aggregation results performed under the second scenario wherein a single packet is received every 7 ms.

TABLE 5

| Packet ID | Arrival time | Average arrival interval | Estimated next arrival time | Aggregation timeout | Action | Delay |
|---|---|---|---|---|---|---|
| 1 | 7 | 7.0 | 14.0 | 13 | Send | 0 |
| 2 | 14 | 7.0 | 21.0 | 20 | Send | 0 |
| 3 | 21 | 7.0 | 28.0 | 27 | Send | 0 |
| 4 | 28 | 7.0 | 35.0 | 34 | Send | 0 |
| 5 | 35 | 7.0 | 42.0 | 41 | Send | 0 |
| 6 | 42 | 7.0 | 49.0 | 48 | Send | 0 |
| 7 | 49 | 7.0 | 56.0 | 55 | Send | 0 |
| 8 | 56 | 7.0 | 63.0 | 62 | Send | 0 |

Total packets arrived: 8
Total packets sent: 8
Average delay per packet: 0

In the second scenario, the dynamic algorithm estimates the next arrival time. Since this time is greater than the aggregation timeout the conclusion is that aggregation will not be beneficial, therefore the packet is sent immediately without waiting for the aggregation timeout, thus delay is saved. The same happens for every next packet. Comparing the results of Table 5 to these of Table 2 demonstrates the benefits of dynamic aggregation over static aggregation.

Table 6 below corresponds to dynamic aggregation performed under the third scenario above, wherein packets are received in short bursts of varying time intervals.

TABLE 6

| Packet ID | Arrival time | Average arrival interval | Estimated next arrival time | Aggregation timeout | Action | Delay |
|---|---|---|---|---|---|---|
| 1 | 3 | 3.00 | 6.00 | 9 | Aggregate | 4 |
| 2 | 5 | 2.50 | 7.50 | 9 | Aggregate | 2 |
| 3 | 7 | 2.33 | 9.33 | 9 | Send | 0 |
| 4 | 10 | 2.33 | 12.33 | 16 | Aggregate | 5 |
| 5 | 15 | 3.33 | 18.33 | 16 | Send | 0 |
| 6 | 22 | 5.00 | 27.00 | 28 | Aggregate | 6 |
| 7 | 28 | 6.00 | 34.00 | 28 | Send | 0 |
| 8 | 33 | 6.00 | 39.00 | 39 | Aggregate | 4 |
| 9 | 37 | 5.00 | 42.00 | 39 | Send | 0 |
| 10 | 40 | 4.00 | 44.00 | 46 | Aggregate | 4 |
| 11 | 44 | 3.67 | 47.67 | 46 | Send | 0 |
| 12 | 49 | 4.00 | 53.00 | 55 | Aggregate | 3 |
| 13 | 52 | 4.00 | 56.00 | 55 | Send | 0 |
| 14 | 59 | 5.00 | 64.00 | 65 | Aggregate, send at timeout | 6 |
| 15 | 67 | 6.00 | 73.00 | 73 | Aggregate | 6 |
| 16 | 73 | 7.00 | 80.00 | 73 | Send | 0 |

Total packets arrived: 16
Total packets sent: 8
Average delay per packet: 2.50

The dynamic aggregation algorithm described above does not improve performance in all cases. In certain pathological cases it can even cause worse performance than static aggregation. Accordingly, an improved dynamic aggregation algorithm is presented below. The improved algorithm introduces a statistical measure of arrival times that improves algorithm performance by providing better estimations.

Figure 14:
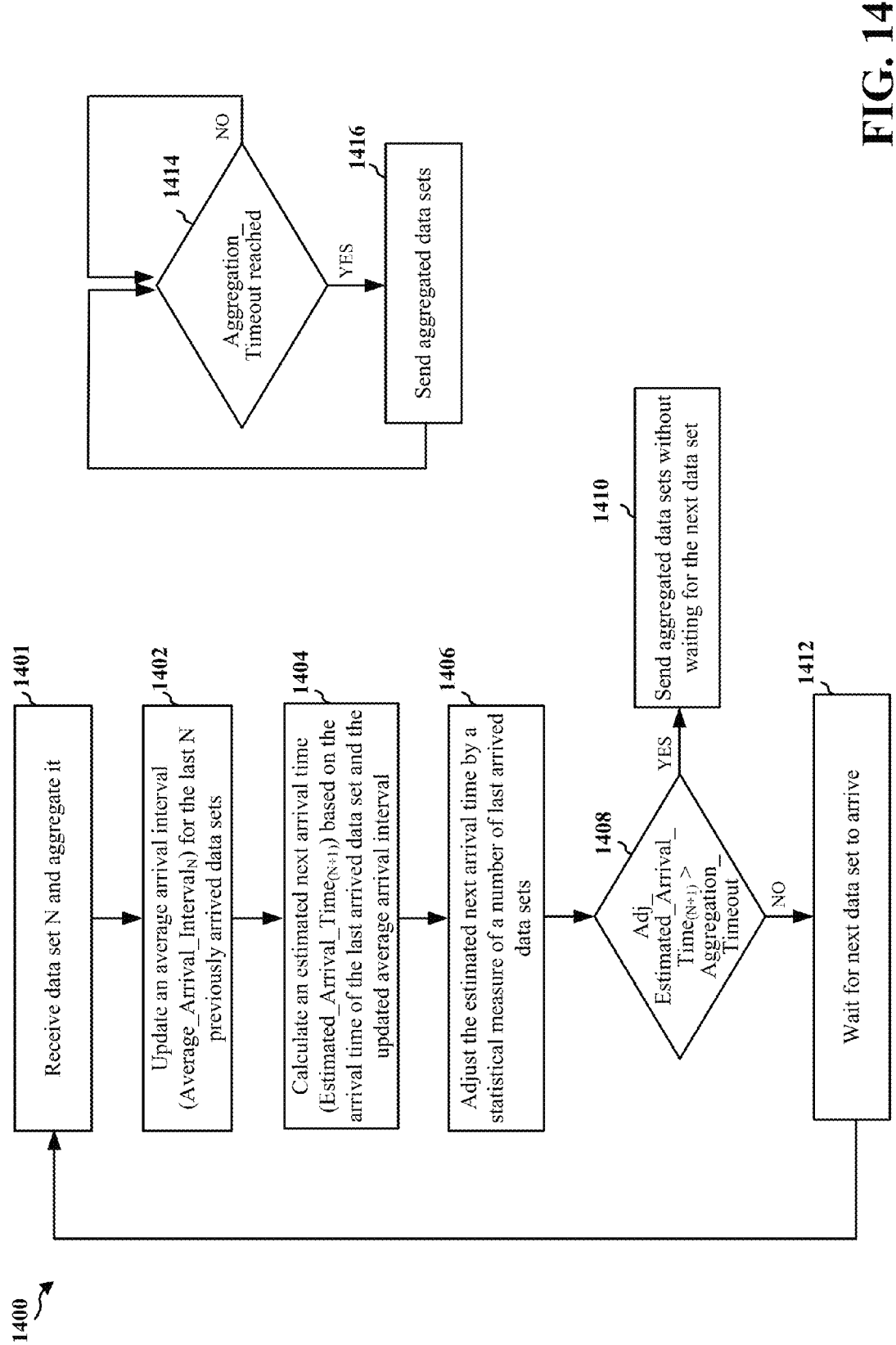
FIG. 14 is a flow chart of a method of dynamic aggregation involving statistical measures of data set arrival time.

FIG. 14 is a flow chart 1400 of an improved method of dynamic aggregation involving data set arrival times. The method and process of FIG. 14 may be executed in any aggregator, such as those described above with respect to FIGS. 1, 2, 3 and 4. In step 1401a data set arrives and is aggregated. In step 1402, an average arrival interval (Average_Arrival_Interval$_N$) is updated for a number (N) of previously arrived data sets.

In one configuration, an average arrival interval corresponds to the average of the arrival intervals times of the last N arrived data sets. For example, if N=3, then:

Average_Arrival_Interval$_1$=Arrival_Interval$_1$

Average_Arrival_Interval$_2$=(Arrival_Interval$_1$+Arrival_Interval$_2$)/2

Average_Arrival_Interval$_3$=(Arrival_Interval$_1$+Arrival_Interval$_2$+Arrival_Interval$_3$)/3

In general form:

Average_Arrival_Interval$_N$=(Arrival_Interval$_1$+Arrival_Interval$_2$+ ... +Arrival_Interval$_N$)/N At step 1404, an estimated next arrival time (Estimated_Arrival_Time$_{(N+1)}$) is calculated for the next data set (N+1) based on the arrival time of the last arrived data set (N) and the updated average arrival interval of the last N data sets. The estimated arrival time corresponds to the estimated time at which the next data set will arrive. The estimated arrival time may be derived as follows:

Estimated_Arrival_Time$_{(N+1)}$=Arrival_Time$_N$+Average_Arrival_Interval$_N$

At step 1406, the estimated next arrival time is adjusted by statistical measure of a number of last N arrived data sets to provide an adjusted estimated next arrival time (Adj_Estimated_Arrival_Time$_{(N+1)}$). In one configuration the statistical measure corresponds to a statistical standard deviation (Standard_Deviation$_N$) of data set arrival time is calculated for the last N arrived data sets. For N which is small (e.g. N=3) the calculation can be performed very efficiently, using calculation methods for standard deviation known to those skilled in the art, such as the optimized calculation methods described at: http://en.wikipedia.org/wiki/Standard_deviation#Rapid_calculation_methods and at http://en.wikipedia.org/wiki/Algorithms_for_calculating_variance. The estimated next arrival time is then adjusted by the standard-deviation calculated, depending on the level of certainty required, using calculation methods known to those skilled in the art. For example, to get 95.45% certainty level, two times the standard deviation is added to the estimated next arrival time to obtain the adjusted estimated next arrival time. See, e.g., http://en.wikipedia.org/wiki/68-95-99.7_rule. The adjusted estimated next arrival time may be derived as follows (for a required certainty of 95.45%):

Adj_Estimated_Arrival_Time$_{(N+1)}$=Estimated_Arrival_Time$_{(N+1)}$+(2*Standard_Deviation$_N$).

The level of certainty is a system/network parameter and represents a tradeoff. When a higher certainty level is specified the algorithm is more conservative and thus might aggregate less. When lower level of certainty is specified the algorithm is more opportunistic and tries to aggregate more, but might miss more estimates. Thus the required level of certainty should be set accordingly.

At step 1408, the adjusted estimated next arrival time of the next data set (N+1) is compared to an aggregation timeout (Aggregation_Timeout). The aggregation timeout corresponds to the time at which the aggregated data sets must be sent, so that the first aggregated data set will not be delayed more than a maximum aggregation delay (Max_Aggregation_Delay). The aggregation timeout is derived as follows:

Aggregation_Timeout=Arrival_Time$_{First\_aggregated\_data\_set}$+Max_Aggregation_Delay, where Max_Aggregation_Delay is the maximum delay that the aggregation can add per data set before sending it.

Continuing with step 1408, if the adjusted estimated arrival time of the next data set exceeds the aggregation time out, in other words, the next data set is estimated to arrive after the aggregation timeout, the process proceeds to step 1410 where the aggregated data sets are sent without waiting for the next data set to arrive. If, however, at step 1408, the estimated arrival time of the next data set does not exceed the aggregation time out, then at step 1412, the process proceeds to wait for the next data set to arrive. When the next data set arrives, the process returns to step 1401 where the process is repeated for a subsequent, next data set.

In order to verify that the Aggregation_Timeout is not exceeded an independent process handles step 1414 in which it is determined whether the aggregation timeout was reached. This independent process is essentially a loop that continuously checks for a timeout. If a timeout is reached, the process proceeds to step 1416 in which the aggregated data is sent. If a timeout is not reached, the process returns to step 1414. The independent loop process ensures that the Aggregation_Timeout is honored in cases where an estimation is missed and the next data set arrives after the estimated time.

Applying these improvements raises the effective aggregation level of the algorithm and eliminates most of the pathological cases, and lowers the aggregated data sets delay, making this scheme more effective in average.

Figure 15:
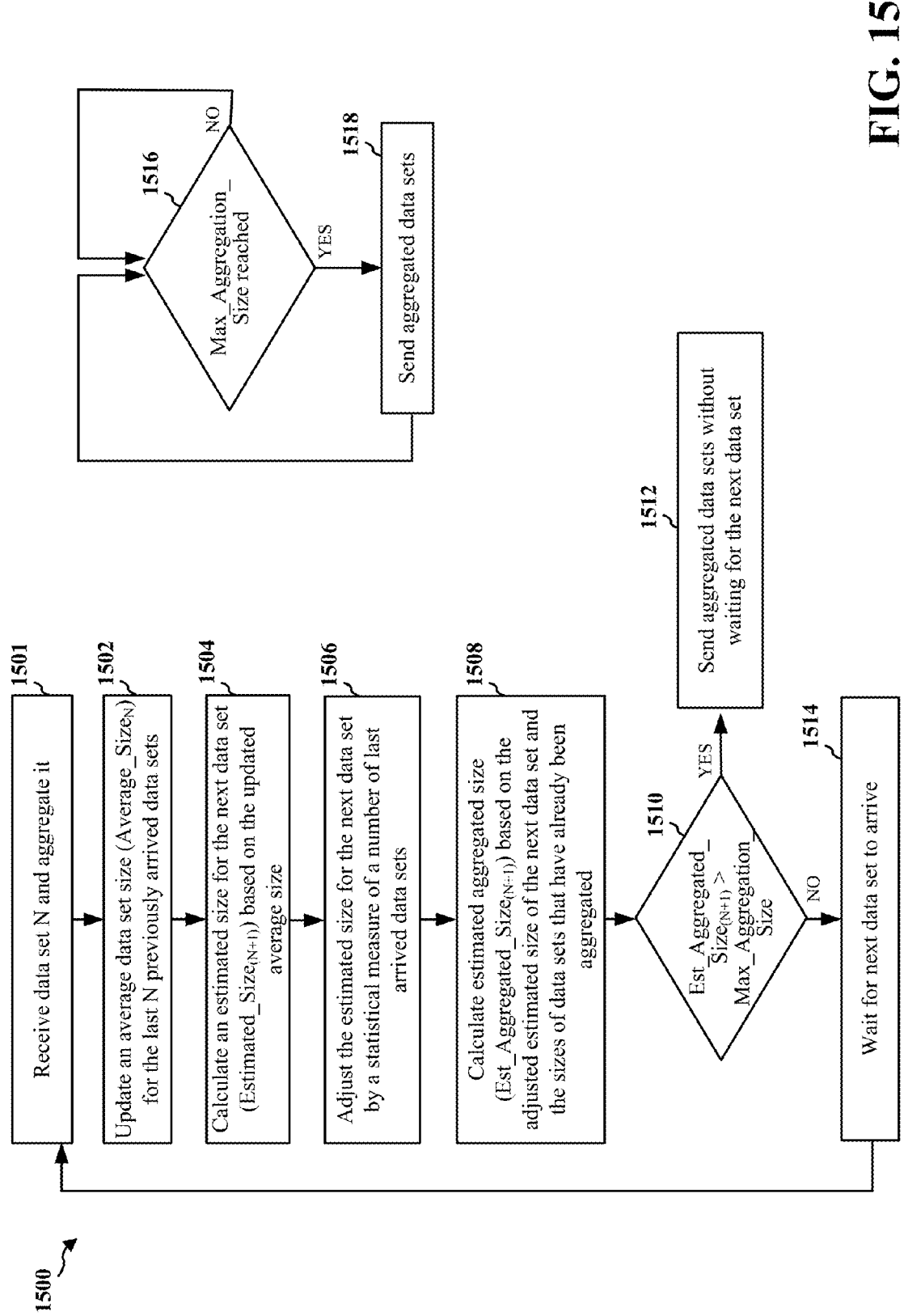
FIG. 15 is a flow chart of a method of dynamic aggregation involving statistical measures of data set size.

In another configuration, dynamic aggregation is performed based on data set size. FIG. 15 is a flow chart 1500 of an improved method of dynamic aggregation involving data set sizes. The method and process of FIG. 15 may be executed in any aggregator, such as those described above with respect to FIGS. 1, 2, 3 and 4. In step 1501a data set arrives and is aggregated. In step 1502, an average data set size (Average_Size$_N$) is updated for a number (N) of previously arrived data sets.

In one configuration, an average data set size corresponds to the average of the sizes of the last N arrived data sets. For example, if N=3, then:

Average_Size$_1$=Arrival_Size$_1$

Average_Size$_2$=(Arrival_Size$_1$+Arrival_Size$_2$)/2

Average_Size$_3$=(Arrival_Size$_1$+Arrival_Size$_2$+ ... +Arrival_Size$_3$)/3

In general form:

Average_Size$_N$=(Arrival_Size$_1$+Arrival_Size$_2$+ ... +Arrival_Size$_N$)/N

At step 1504, an estimated size of the next data set (Estimated_Size$_{(N+1)}$) is calculated for the next data set (N+1) based on the updated average size of the last N data sets. The estimated size corresponds to the estimated size of the next data set to arrive. For example, if the average of last N data sets is X then the estimated size of the next data set will also be X. The estimated size may be derived as follows:

Estimated_Size$_{(N+1)}$=Average_Size$_N$

At step 1506, the estimated size is adjusted by statistical measure of a number of last N arrived data sets to provide an adjusted estimated next arrival size (Adj_Estimated_Size$_{(N+1)}$). In one configuration the statistical measure corresponds to a statistical standard deviation (Standard_Deviation$_N$) of data set sizes calculated for the last N arrived data sets. For N which is small (e.g. N=3) the calculation can be performed very efficiently, using calculation methods for standard deviation known to those skilled in the art, such as the optimized calculation methods described at: http://en.wikipedia.org/wiki/Standard_deviation#Rapid_calculation_methods and at http://en.wikipedia.org/wiki/Algorithms_for_calculating_variance. The estimated size is then adjusted by the standard-deviation calculated, depending on the level of certainty required. For example, to get 95.45% certainty level, two times the standard deviation is added to the estimated size to obtain the adjusted estimated next size, using calculation methods known to those skilled in the art. See e.g., http://en.wikipedia.org/wiki/68-95-99.7_rule. The adjusted estimated next size may be derived as follows:

$$\text{Adj\_Estimated\_Size}_{(N+1)} = \text{Estimated\_Size}_{(N+1)} + (2*\text{Standard\_Deviation}_N).$$

At step 1508, an estimated aggregated size (Estimated_Aggregated_Size$_{(N+1)}$) is calculated based on the adjusted estimated size of the next data set and the sizes of the N data sets that have already been aggregated. The estimated aggregated size corresponds to a total measure of the size of the already aggregated N data sets plus the estimated size of the next (N+1) data set, and may be derived as follows:

$$\text{Estimated\_Aggregated\_Size}_{(N+1)} = \text{Adj\_Estimated\_Size}_{(N+1)} + \text{Aggregated\_Size}_N,$$

where Aggregated_Size$_N$ is the summation of the sizes of N data sets that have already been aggregated.

At step 1510, the estimated aggregated size is compared to a maximum aggregation size (Max_Aggregation_Size). The maximum aggregation size corresponds to the maximum size that the aggregated data sets can have before the aggregated data sets must be sent. Max_Aggregation_Size is a system/network parameter that is set per specific implementation. As an example, Max_Aggregation_Size can reflect the size of the "aggregation buffer"—that is, the amount of memory that can be used to store the aggregated data sets before they are sent. As another example, it can reflect the maximal data-set-size the network can send as a single data-set—typically networks impose limits on maximal "packet" or "frame" size that can be delivered as one. Aggregating a cumulative data size that exceeds the system/network limit is not beneficial as the aggregated data-sets could not be sent as one. Therefore the process described here aggregates as much as possible while adhering to the system/network limits. For example, a maximum aggregation size may be 5 k bits.

Continuing with step 1510, if the estimated aggregated size exceeds the maximum aggregation size, the process proceeds to step 1512 where the aggregated data sets are sent without waiting for the next data set to arrive. If, however, at step 1510, the estimated aggregated size does not exceed the maximum aggregation size, then at step 1514 the process proceeds to wait for the next data set to arrive. When the next data set arrives, the process returns to step 1501 where the process is repeated for a subsequent, next data set.

In order to verify that the Max_Aggregation_Size is not exceeded an independent process handles step 1516 in which it is determined whether the maximum aggregation size is reached. This independent process is essentially a loop that continuously checks for an exceeding of maximum aggregation size. If the maximum aggregation size is exceeded, the process proceeds to step 1518 in which the aggregated data is sent. If the maximum aggregation size is not exceeded, the process returns to step 1516. The independent loop process ensures that the Max_Aggregation_Size is honored in cases where an estimation is missed and the next data set size is larger than the estimated size.

Figure 16:
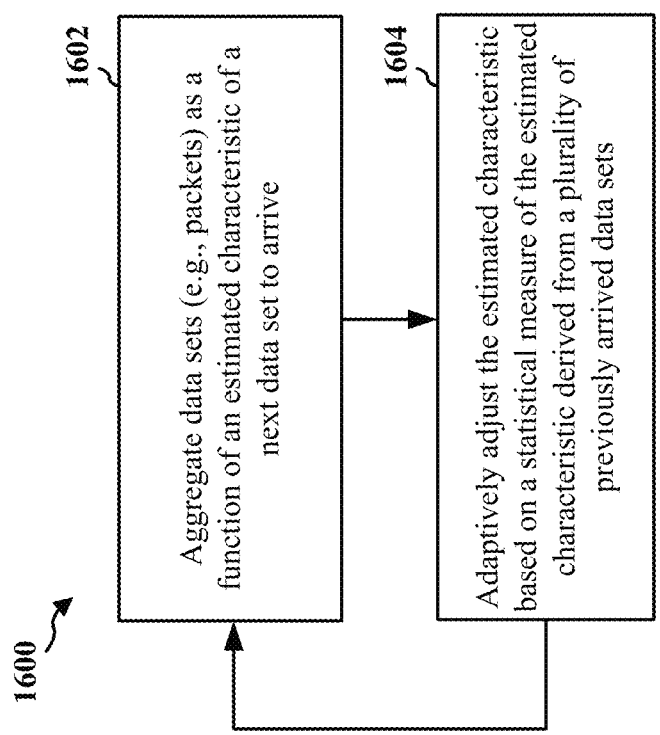
FIG. 16 is a flow chart of a method of dynamic aggregation involving statistical measures of characteristics of data sets.

FIG. 16 is a flow chart 1600 of a method of dynamic aggregation involving the statistical aspects, e.g., estimated arrival time, estimated data set size, described above. The method may be performed by a component of a communications system. For example, the method may be performed by either of an UE or eNB of a wireless communications system. At step 1602, the component aggregates data sets as a function of an estimated characteristic of a next data set to arrive. At step 1604, the component adaptively adjusts the estimated characteristic based on a statistical measure of the estimated characteristics derived from a plurality of previously arrived data sets.

With reference to FIG. 14, in cases where the estimated characteristic corresponds to an estimated next arrival time of the next data set, the component aggregates data sets by performing the following for each data set in a series of data sets: aggregating the last arrived data set, updating an average arrival interval for a number of previously arrived data sets, calculating an estimated next arrival time based on the arrival time of the last arrived data set and the updated average arrival interval, and waiting for the next data set to arrive if the estimated next arrival time does not exceed an aggregation time out, or alternatively sending the aggregated data sets if the estimated next arrival time exceeds the aggregation time out.

With reference to FIG. 15, in cases where the estimated characteristic corresponds to an estimated size of the next data set, the component aggregates data sets by performing the following for each data set in a series of data sets: aggregating the last arrived data set, updating an average size for a number of previously arrived data sets, calculating an estimated next size based on the updated average size, calculating an estimated aggregated size based the estimated next size and a size of the already aggregated data sets, and waiting for the next data set to arrive if the estimated aggregated size does not exceed a maximum aggregation size, or alternatively sending the aggregated data sets if the estimated aggregated size exceeds the maximum aggregation size.

Figure 17:
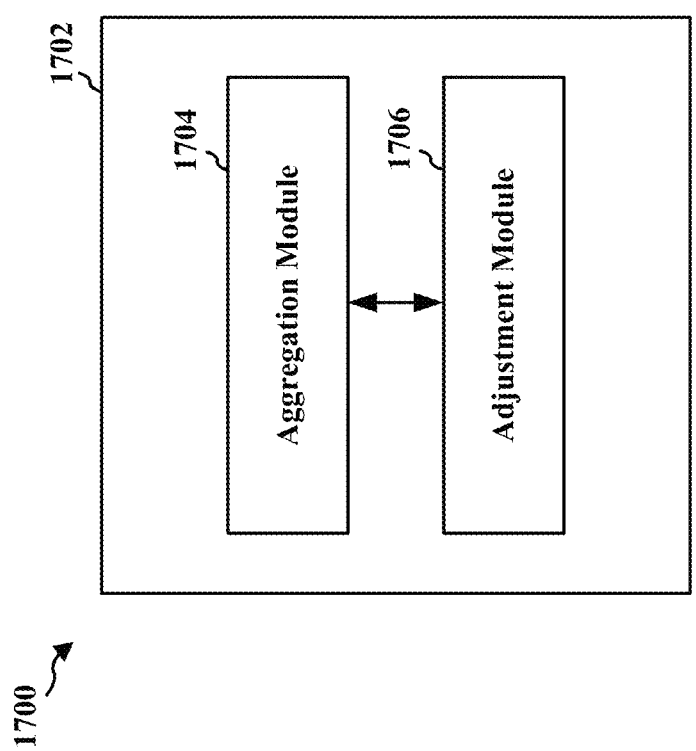
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus includes an aggregation module 1704 that aggregates data sets as a function of an estimated characteristic, e.g., data set arrival time, data set size, of a next data set to arrive, and an adjustment module 1706 that adaptively adjusts the estimated characteristic based on a statistical measure of the estimated characteristics derived from a plurality of previously arrived data sets.

The apparatus may include additional modules that perform each of the steps of the algorithms in the aforementioned flow charts of FIGS. 14-16. As such, each step in the aforementioned flow charts of FIGS. 14-16 may be performed by a module and the apparatus may include one or more of those modules. The modules may be one or more hardware components specifically configured to carry out the stated processes/algorithms, implemented by a processor configured to perform the stated processes/algorithms, stored within a computer-readable medium for implementation by a processor, or some combination thereof.

Figure 18:
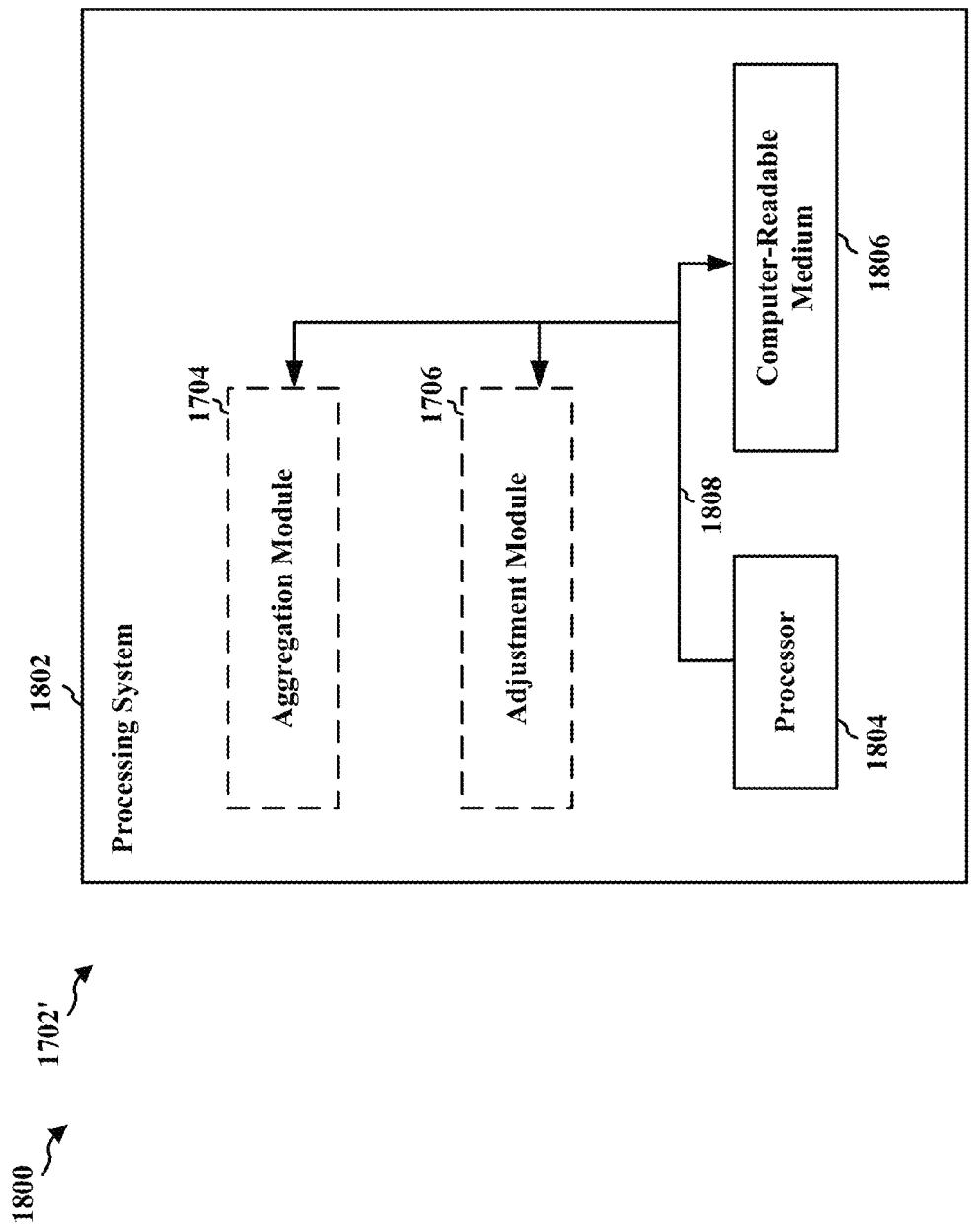
FIG. 18 is a diagram illustrating an example of a hardware implementation for an apparatus employing a processing system.

FIG. 18 is a diagram 1800 illustrating an example of a hardware implementation for an apparatus 1702' employing a processing system 1802. The processing system 1802 may be implemented with a Bus/Fabric/NOC architecture, represented generally by the bus 1808. The Bus/Fabric/NOC 1808 may include any number of interconnecting buses and bridges depending on the specific application of the processing system 1802 and the overall design constraints. The Bus/Fabric/

NOC 1808 links together various circuits including one or more processors and/or hardware modules, represented by the processor 1804, the modules 1704, 1706, and the computer-readable medium 1806. The Bus/Fabric/NOC 1808 may also link various other circuits such as timing sources, peripherals, voltage regulators, and power management circuits, which are well known in the art, and therefore, will not be described any further.

The processing system 1802 includes a processor 1804 coupled to a computer-readable medium 1806. The processor 1804 is responsible for general processing, including the execution of software stored on the computer-readable medium 1806. The software, when executed by the processor 1804, causes the processing system 1802 to perform the various functions described supra for any particular apparatus. The computer-readable medium 1806 may also be used for storing data that is manipulated by the processor 1804 when executing software. The processing system 1802 further includes at least one of the modules 1704 and 1706. The modules may be software modules running in the processor 1804, resident/stored in the computer readable medium 1806, one or more hardware modules coupled to the processor 1804, or some combination thereof. The processing system 1802 may be a component of the eNB 1010 and may include the memory 1076 and/or at least one of the TX processor 1016, the RX processor 1070, and the controller/processor 1075. Alternatively, the processing system 1802 may be a component of the UE 1050 and may include the memory 1060 and/or at least one of the TX processor 1068, the RX processor 1056, and the controller/processor 1059.

In one configuration, the apparatus 1702/1702' for communication includes means for aggregating data sets as a function of an estimated characteristic of a next data set to arrive, and means for adaptively adjusting the estimated characteristic based on a statistical measure of the estimated characteristic derived from a plurality of previously arrived data sets. The aforementioned means may be one or more of the aforementioned modules of the apparatus 1702 and/or the processing system 1802 of the apparatus 1702' configured to perform the functions recited by the aforementioned means.

When the estimated characteristic corresponds to an estimated next arrival time of the next data set, the means for aggregating data sets is configured to, for each data set in a series of data sets, aggregate the last arrived data set, update an average arrival interval for a number of previously arrived data sets, calculate an estimated next arrival time based on the arrival time of the last arrived data set and the updated average arrival interval, and wait for the next data set to arrive if the estimated next arrival time does not exceed an aggregation time out, or alternatively send the aggregated data sets if the estimated next arrival time exceeds an aggregation time out.

When the estimated characteristic corresponds to an estimated size of the next data set, the means for aggregating data sets is configured to, for each data set in a series of data sets, aggregate the last arrived data set, update an average size for a number of previously arrived data sets, calculate an estimated next size based on the updated average size, calculate an estimated aggregated size based the estimated next size and a size of the already aggregated data sets, and wait for the next data set to arrive if the estimated aggregated size does not exceed a maximum aggregation size, or alternatively send the aggregated data sets if the estimated aggregated size exceed the maximum aggregation size.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communications, comprising:
   aggregating data sets as a function of an estimated next arrival time of a next data set to arrive at an aggregator, and as a function of an estimated aggregated size that is based on an estimated size of the next data set; and
   adaptively adjusting the estimated next arrival time based on a statistical measure of the estimated next arrival time derived from a plurality of previously arrived data sets, and adaptively adjusting the estimated size of the next data set based on a statistical measure of the estimated size derived from a plurality of previously arrived data sets, the respective statistical measures comprising a standard deviation;
   wherein aggregating data sets comprises:
      waiting for the next data set to arrive at the aggregator if the estimated next arrival time does not exceed an aggregation time out, and the estimated aggregated size does not exceed a maximum aggregation size; and
      sending the aggregated data sets over a communication link without waiting for the next data set to arrive at the aggregator if either of the estimated next arrival time exceeds the aggregation time out, or the estimated aggregated size exceeds the maximum aggregation size.

2. The method of claim 1, wherein aggregating data sets comprises:
   for each data set in a series of data sets:
      aggregating a last arrived data set;
      updating an average arrival interval for a number of previously arrived data sets and
      calculating the estimated next arrival time based on the arrival time of the last arrived data set and the updated average arrival interval.

3. The method of claim 1, wherein aggregating data sets comprises:
   for each data set in a series of data sets:
      aggregating a last arrived data set;
      updating an average size for a number of previously arrived data sets;

calculating an estimated next size based on the updated average size and calculating the estimated aggregated size based the estimated next size and a size of the already aggregated data sets.

4. An apparatus for communication, comprising:

means for aggregating data sets as a function of an estimated next arrival time of a next data set to arrive at an aggregator, and as a function of an estimated aggregated size that is based on an estimated size of the next data set; and means for adaptively adjusting the estimated next arrival time based on a statistical measure of the estimated next arrival time derived from a plurality of previously arrived data sets, and adaptively adjusting the estimated size of the next data set based on a statistical measure of the estimated size derived from a plurality of previously arrived data sets, the respective statistical measures comprising a standard deviation wherein the means for aggregating data sets is configured to:

wait for the next data set to arrive at the aggregator if the estimated next arrival time does not exceed an aggregation time out, and the estimated aggregated size does not exceed a maximum aggregation size; and send the aggregated data sets over a communication link without waiting for the next data set to arrive at the aggregator if either of the estimated next arrival time exceeds the aggregation time out, or the estimated aggregated size exceeds the maximum aggregation size.

5. The apparatus of claim 4, wherein the means for aggregating data sets is configured to, for each data set in a series of data sets:

aggregate a last arrived data set;

update an average arrival interval for a number of previously arrived data sets; and calculate the estimated next arrival time based on the arrival time of the last arrived data set and the updated average arrival interval.

6. The apparatus of claim 4, wherein the means for aggregating data sets is configured to, for each data set in a series of data sets:

aggregate a last arrived data set;

update an average size for a number of previously arrived data sets;

calculate an estimated next size based on the updated average size; and calculate the estimated aggregated size based the estimated next size and a size of the already aggregated data sets.

7. An apparatus for communication, comprising:

a memory; and a processing system coupled to the memory and comprising:

an aggregation module configure to aggregate data sets as a function of an estimated next arrival time of a next data set to arrive at an aggregator, and as a function of an estimated aggregated size that is based on an estimated size of the next data set; and an adjustment module configured to adaptively adjust the estimated next arrival time based on a statistical measure of the estimated next arrival time derived from a plurality of previously arrived data sets, and adaptively adjusting the estimated size of the next data set based on a statistical measure of the estimated size derived from a plurality of previously arrived data sets, the respective statistical measures comprising a standard deviation wherein the aggregation module aggregates data sets by being configured to:

wait for the next data set to arrive at the aggregator if the estimated next arrival time does not exceed an aggregation time out, and the estimated aggregated size does not exceed a maximum aggregation size; and send the aggregated data sets over a communication link without waiting for the next data set to arrive at the aggregator if either of the estimated next arrival time exceeds the aggregation time out, or the estimated aggregated size exceeds the maximum aggregation size.

8. The apparatus of claim 7, wherein the aggregation module aggregates data sets by being configured to:

aggregate a last arrived data set;

update an average arrival interval for a number of previously arrived data sets; and calculate the estimated next arrival time based on the arrival time of the last arrived data set and the updated average arrival interval.

9. The apparatus of claim 7, wherein the aggregation module aggregates data sets by being configured to:

aggregate a last arrived data set;

update an average size for a number of previously arrived data sets;

calculate an estimated next size based on the updated average size; and calculate the estimated aggregated size based the estimated next size and a size of the already aggregated data sets.

10. A non-transitory computer-readable medium comprising code for:

aggregating data sets as a function of an estimated next arrival time of a next data set to arrive at an aggregator, and as a function of an estimated aggregated size that is based on an estimated size of the next data set; and adaptively adjusting the estimated next arrival time based on a statistical measure of the estimated next arrival time derived from a plurality of previously arrived data sets, and adaptively adjusting the estimated size of the next data set based on a statistical measure of the estimated size derived from a plurality of previously arrived data sets, the respective statistical measures comprising a standard deviation;

wherein aggregating data sets comprises:

waiting for the next data set to arrive at the aggregator if the estimated next arrival time does not exceed an aggregation time out, and the estimated aggregated size does not exceed a maximum aggregation size; and sending the aggregated data sets over a communication link without waiting for the next data set to arrive at the aggregator if either of the estimated next arrival time exceeds the aggregation time out, or the estimated aggregated size exceeds the maximum aggregation size.

11. The non-transitory computer-readable medium of claim 10, wherein the code for aggregating data sets comprises code for:

aggregating a last arrived data set;

updating an average arrival interval for a number of previously arrived data sets; and calculating the estimated next arrival time based on the arrival time of the last arrived data set and the updated average arrival interval.

12. The non-transitory computer-readable medium of claim 10, wherein the code for aggregating data sets comprises code for:
  aggregating a last arrived data set;
  updating an average size for a number of previously arrived data sets;
  calculating an estimated next size based on the updated average size; and
  calculating the estimated aggregated size based the estimated next size and a size of the already aggregated data sets.

* * * * *